US012767384B2

(12) United States Patent
Kawaji et al.

(10) Patent No.: US 12,767,384 B2
(45) Date of Patent: Oct. 20, 2026

(54) CUSHIONING MATERIAL AND PACKAGED PRODUCT

(71) Applicant: SEIKO EPSON CORPORATION, Tokyo (JP)

(72) Inventors: Michiko Kawaji, Kai (JP); Makoto Furuhata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 48 days.

(21) Appl. No.: 18/466,023

(22) Filed: Sep. 13, 2023

(65) Prior Publication Data

US 2024/0092528 A1 Mar. 21, 2024

(30) Foreign Application Priority Data

Sep. 15, 2022 (JP) ................................. 2022-146710

(51) Int. Cl.

*B65D 5/50* (2006.01)
*B32B 7/022* (2019.01)
*B32B 29/00* (2006.01)
*B32B 29/08* (2006.01)

(52) U.S. Cl.

CPC ............ *B65D 5/5054* (2013.01); *B32B 7/022* (2019.01); *B32B 29/005* (2013.01); *B32B 29/08* (2013.01); *B32B 2307/54* (2013.01); *B32B 2553/02* (2013.01)

(58) Field of Classification Search

CPC .............. B65D 5/5054; B32B 2553/02; B32B 2250/40
USPC .......................................................... 206/521
See application file for complete search history.

(56) References Cited

U.S. PATENT DOCUMENTS 3,337,111 A 8/1967 Petriekis et al.
3,536,245 A 10/1970 Palmer
3,648,920 A 3/1972 Stump
3,929,536 A 12/1975 Maughan
4,399,915 A 8/1983 Sorenson
4,771,893 A 9/1988 Liebel
4,865,201 A 9/1989 Liebel
4,889,252 A * 12/1989 Rockom ............ B65D 81/3858 229/103.11
5,048,689 A 9/1991 McFarland
5,131,541 A 7/1992 Liebel
5,441,170 A * 8/1995 Bane, III ........... B65D 81/3862 206/523
5,495,810 A * 3/1996 Yoshii ....................... B31C 3/00 229/4.5
5,670,238 A * 9/1997 Earl ........................ B32B 29/08 428/920
5,733,403 A 3/1998 Morley (Continued)

FOREIGN PATENT DOCUMENTS

CN 1126457 A 7/1996
CN 206884372 U 1/2018

(Continued)

*Primary Examiner* — Nathan J Jenness
*Assistant Examiner* — Justin Caudill
(74) *Attorney, Agent, or Firm* — Spencer Fane LLP

(57) ABSTRACT

Provided is a cushioning material obtained by stacking a plurality of cushioning sheets, in which the plurality of cushioning sheets include a first cushioning sheet, a second cushioning sheet having a strength stronger than that of the first cushioning sheet, and a third cushioning sheet having a strength stronger than that of the second cushioning sheet.

5 Claims, 20 Drawing Sheets

(56) References Cited

U.S. PATENT DOCUMENTS

| | | | | |
|---|---|---|---|---|
| 6,079,617 | A * | 6/2000 | Kim | B65D 5/16 229/122 |
| 6,190,756 | B1 | 2/2001 | Yokoyama et al. | |
| 8,652,613 | B2 | 2/2014 | Lai et al. | |
| 10,357,936 | B1 * | 7/2019 | Vincent | B32B 27/10 |
| 10,392,153 | B2 | 8/2019 | Mehta | |
| 2003/0211292 | A1 * | 11/2003 | Malone | B32B 29/08 428/182 |
| 2007/0141318 | A1 * | 6/2007 | Balthes | B32B 5/28 442/302 |
| 2013/0075408 | A1 * | 3/2013 | Childress | B32B 29/08 428/137 |
| 2014/0093705 | A1 * | 4/2014 | Shi | B65D 81/05 428/182 |
| 2014/0127475 | A1 | 5/2014 | Bonebrake | |
| 2015/0056418 | A1 * | 2/2015 | Yeh | A45C 5/02 428/189 |
| 2018/0117870 | A1 * | 5/2018 | Zeilstra | B31B 50/006 |
| 2018/0290815 | A1 * | 10/2018 | Waltermire | B65D 81/3897 |
| 2020/0009822 | A1 * | 1/2020 | Koslowski | A45C 5/02 |

FOREIGN PATENT DOCUMENTS

| | | | |
|---|---|---|---|
| CN | 208647391 | U | 3/2019 |
| CN | 113276484 | A | 8/2021 |
| CN | 215321240 | U | 12/2021 |
| EP | 1 902 964 | A1 | 3/2008 |
| JP | S60-032274 | U | 3/1985 |
| JP | H07-076370 | A | 3/1995 |
| JP | 3051943 | U | 6/1998 |
| JP | 2005008277 | A * | 1/2005 |
| JP | 3648340 | B | 5/2005 |
| JP | 2010-274936 | A | 12/2010 |
| JP | 2017071400 | A * | 4/2017 |
| WO | 1997/010157 | A1 | 3/1997 |

* cited by examiner

CUSHIONING MATERIAL AND PACKAGED PRODUCT

The present application is based on, and claims priority from JP Application Serial Number 2022-146710, filed Sep. 15, 2022, the disclosure of which is hereby incorporated by reference herein in its entirety.

BACKGROUND

1. Technical Field

The present disclosure relates to a cushioning material and a packaged product.

2. Related Art

A cushioning material that cushions an external force applied to the contents packed in a packaging box is known. For example, JP-A-2010-274936 discloses a technique related to a cushioning material in which a plurality of cushioning sheets are stacked.

However, when the cushioning material includes a plurality of cushioning sheets having the same structure as in the related art, even though an external force is applied to the cushioning material, each cushioning sheet is not deformed, and it may not be possible to ascertain that an impact has been applied to the cushioning material.

SUMMARY

According to an aspect of the present disclosure, there is provided a cushioning material having a multilayer structure, including: a first layer; a second layer having a strength stronger than that of the first layer; and a third layer having a strength stronger than that of the second layer.

According to another aspect of the present disclosure, there is provided a packaged product including: a packaging box configured by a cushioning material having a multilayer structure; and contents packed in the packaging box, in which the cushioning material includes a first layer, a second layer having a strength stronger than that of the first layer, and a third layer having a strength stronger than that of the second layer, and the packaging box is provided such that a cross section of the first layer in the cushioning material is visually recognizable.

According to still another aspect of the present disclosure, there is provided a packaged product including: a packaging box; contents packed in the packaging box; and a cushioning material having a multilayer structure that is accommodated in the packaging box and supports the contents inside the packaging box, in which the cushioning material includes a first layer, a second layer having a strength stronger than that of the first layer, and a third layer having a strength stronger than that of the second layer, and the packaging box is provided with an opening such that a cross section of the cushioning material is visually recognizable.

DESCRIPTION OF EMBODIMENTS

Embodiments for carrying out the present disclosure will be described below with reference to the drawings. Here, in each drawing, the dimensions and scales of each portion are appropriately different from the actual ones. In addition the embodiments described below are preferred specific examples of the present disclosure, and therefore, various technically preferable limitations are given, but the scope of the present disclosure is not limited to these forms unless there is a description to the effect that the present disclosure is particularly limited in the following description.

A. First Embodiment

A packaging material 1 that accommodates an electronic device 100 will be described below.

A. 1. Overall Overview of Packaging Materials

Figure 1:
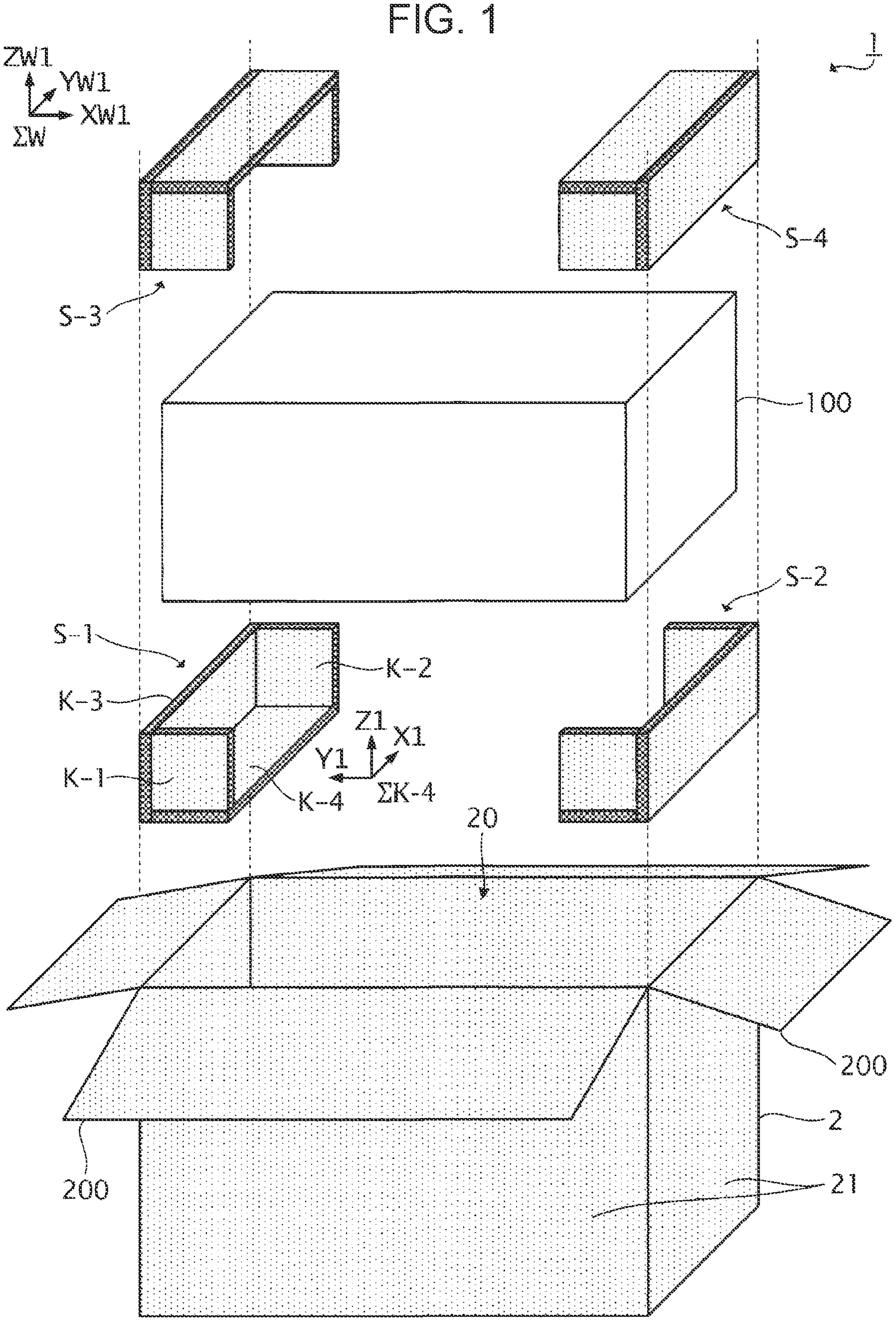
FIG. 1 is an exploded perspective view showing an example of a configuration of a packaging material according to a first embodiment of the present disclosure.

FIG. 1 is an exploded perspective view showing a configuration of the packaging material 1.

As shown in FIG. 1, the packaging material 1 accommodates the electronic device 100. Specifically, the packaging material 1 includes a packaging box 2 capable of accommodating the electronic device 100, and a plurality of support materials S for supporting the electronic device 100 accommodated in the packaging box 2.

Here, the electronic device 100 is, for example, a device that can be accommodated in the packaging box 2, such as a printing device, a television, a refrigerator, a washing machine, a microwave oven, or a personal computer, and is an example of "contents". In the present embodiment, the electronic device 100 will be illustrated as the "contents", but the present disclosure is not limited to such an aspect. The "contents" may be any articles that can be accommodated in the packaging box 2. The "contents" may be, for example, ceramics such as tableware or ornaments, or wood products such as furniture.

In the following, the packaging material 1 and the contents such as the electronic device 100 and the like accommodated in the packaging material 1 may be collectively referred to as "packaged products".

As shown in FIG. 1, in the present embodiment, it is assumed that the packaging material 1 has four support materials S-1 to S-4. In the present embodiment, the electronic device 100 and the four support materials S-1 to S-4 are inserted into the packaging box 2 through an opening 20 of the packaging box 2, and then accommodated in the packaging box 2 by closing the opening 20 with an upper lid 200 coupled to a side surface 21 of the packaging box 2.

In the following, for convenience of description, a packaging box coordinate system ΣW fixed to the packaging box 2 will be introduced. The packaging box coordinate system ΣW is a three-axis orthogonal coordinate system having a ZW-axis extending in a ZW1 direction, which is a direction from a bottom surface of the packaging box 2 toward the opening 20, an XW-axis extending in an XW1 direction orthogonal to the ZW1 direction, and a YW-axis extending in a YW1 direction orthogonal to the ZW1 direction and the XW1 direction. In the present embodiment, a case where the XW-axis, the YW-axis, and the ZW-axis are orthogonal to each other is illustrated, but the present disclosure is not limited to such an aspect. The XW-axis, the YW-axis, and the ZW-axis need only intersect each other. Also, hereinafter, a direction opposite to the XW1 direction is referred to as an XW2 direction, a direction opposite to the YW1 direction is referred to as a YW2 direction, and a direction opposite to the ZW1 direction is referred to as a ZW2 direction.

As shown in FIG. 1, the support material S-1 is a support material S that holds a lower end portion of the electronic device 100 in the ZW2 direction of the electronic device 100 and in the XW2 direction of the electronic device 100 when the electronic device 100 and the four support materials S-1 to S-4 are accommodated in the packaging box 2. The support material S-2 is a support material S that holds the lower end portion of the electronic device 100 in the ZW2 direction of the electronic device 100 and in the XW1 direction of the electronic device 100 when the electronic device 100 and the four support materials S-1 to S-4 are accommodated in the packaging box 2. The support material S-3 is a support material S that holds an upper end portion of the electronic device 100 in the ZW1 direction of the electronic device 100 and in the XW2 direction of the electronic device 100 when the electronic device 100 and the four support materials S-1 to S-4 are accommodated in the packaging box 2. The support material S-4 is a support material S that holds the upper end portion of the electronic device 100 in the ZW1 direction of the electronic device 100 and in the XW1 direction of the electronic device 100 when the electronic device 100 and the four support materials S-1 to S-4 are accommodated in the packaging box 2.

As shown in FIG. 1, the support material S includes a plurality of cushioning materials K for cushioning an external force applied to the electronic device 100 accommodated in the packaging box 2. Specifically, in the present embodiment, as an example, it is assumed that the support material S includes four cushioning materials K-1 to K-4. In the present embodiment, it is assumed that each of the four cushioning materials K-1 to K-4 provided on the support material S is made of cardboard.

In the following, for convenience of description, a cushioning material coordinate system ΣK fixed to the cushioning material K will be introduced. The cushioning material coordinate system ΣK is an orthogonal coordinate system having an X-axis, a Y-axis, and a Z-axis which are orthogonal to each other. Here, when the support material S having the cushioning material K is accommodated in the packaging box 2 together with the electronic device 100, the Z-axis is an axis extending in a Z1 direction, which is a direction from a surface in contact with the packaging box 2 toward a surface in contact with the electronic device 100 among two surfaces of the cushioning material K. Further, the X-axis is an axis extending in an X1 direction, which is a direction orthogonal to the Z1 direction and a direction in which the cushioning material K extends. Further, the Y-axis is an axis extending in a Y1 direction, which is a direction orthogonal to the Z1 direction and the X1 direction and a direction in which the cushioning material K extends.

For example, in FIG. 1, among the cushioning materials K-1 to K-4 of the support material S-1, a cushioning material coordinate system ΣK-4 fixed to the cushioning material K-4 extending in the XW1 direction and the YW1 direction is illustrated. As shown in FIG. 1, the cushioning material coordinate system ΣK-4 is fixed to the cushioning material K-4 such that the cushioning material is such that the X1 direction is parallel to the YW1 direction, the Z1 direction is parallel to the ZW1 direction, and the Y1 direction is parallel to the XW2 direction.

In the present embodiment, a case where the X-axis, the Y-axis, and the Z-axis are orthogonal to each other is illustrated, but the present disclosure is not limited to such an aspect. The X-axis, the Y-axis, and the Z-axis need only intersect each other. Also, hereinafter, a direction opposite to the X1 direction is referred to as an X2 direction, a direction opposite to the Y1 direction is referred to as a Y2 direction, and a direction opposite to the Z1 direction is referred to as a Z2 direction.

A. 2. Overview of Cushioning Material

The cushioning material K according to the present embodiment will be described below with reference to FIGS. 2 to 4.

Figure 2:
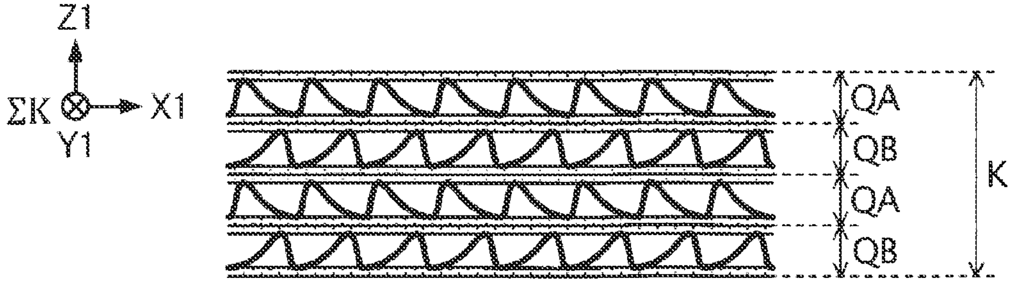
FIG. 2 is a cross-sectional view showing an example of a structure of a cushioning material.

FIG. 2 is a cross-sectional view of the cushioning material K when the cushioning material K is cut along a plane having the Y1 direction as a normal direction.

As shown in FIG. 2, the cushioning material K has a configuration in which a plurality of cushioning sheets QA and a plurality of cushioning sheets QB are stacked. Here, the cushioning sheet QA is a cushioning sheet Q whose strength in the X2 direction is stronger than a strength in the X1 direction when an external force is applied from an object such as the electronic device 100 located in the Z1 direction when viewed from the cushioning sheet QA. Further, the cushioning sheet QB is a cushioning sheet Q whose strength in the X1 direction is stronger than a strength in the X2 direction when an external force is applied from an object such as the electronic device 100 located in the Z1 direction when viewed from the cushioning sheet QB.

As shown in FIG. 2, in the present embodiment, a case where the cushioning material K has a configuration in which a plurality of cushioning sheets QA and a plurality of cushioning sheets QB are alternately stacked is assumed as an example. However, the present disclosure is not limited to such an aspect. For example, a cushioning sheet Q different from the cushioning sheet QA and the cushioning sheet QB, for example, a cushioning sheet QT, which will be described later, may be stacked between one cushioning sheet QA among the plurality of cushioning sheets QA and one cushioning sheet QB closest to the one cushioning sheet QA among the plurality of cushioning sheets QB.

Also, in the present embodiment, a case where the number of the plurality of cushioning sheets QA included in the cushioning material K and the number of the plurality of cushioning sheets QB included in the cushioning material K are the same is assumed as an example. However, the present disclosure is not limited to such an aspect. For example, the cushioning material K may have a configuration in which one or more cushioning sheets QA and one or more cushioning sheets QB are stacked. Further, for example, the cushioning material K may include one or more cushioning sheets QA and a plurality of cushioning sheets QB having a larger number than the one or more cushioning sheets QA, or may include a plurality of cushioning sheets QA and one or more cushioning sheets QB having a smaller number than the plurality of cushioning sheets QA.

Figure 3:
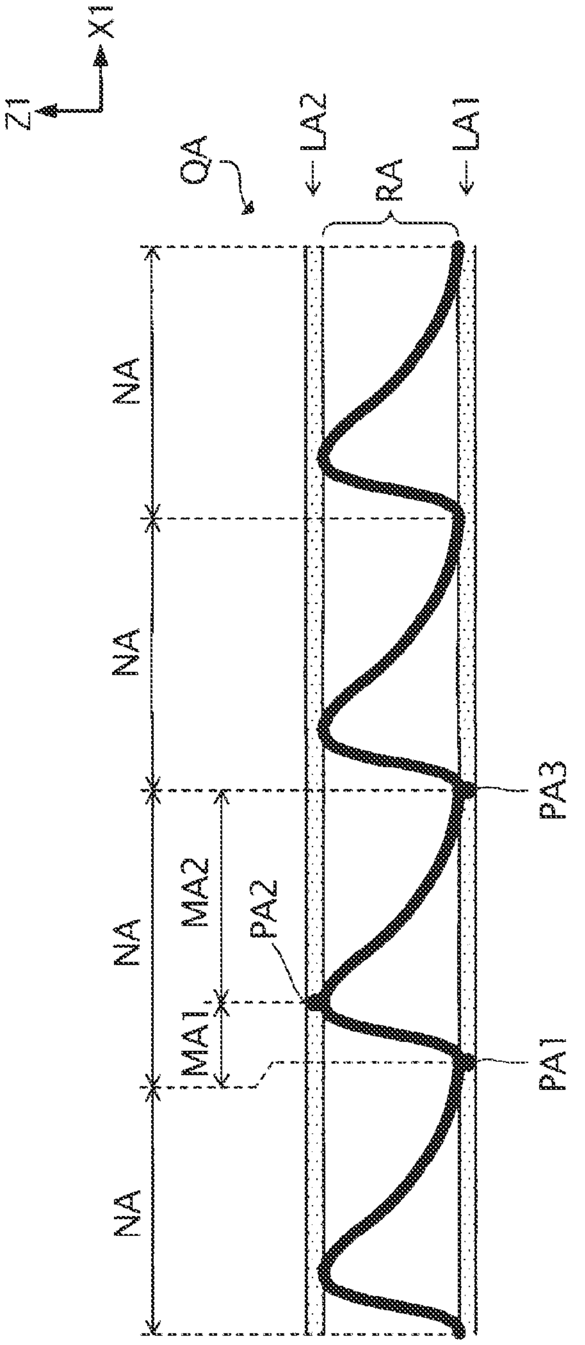
FIG. 3 is a cross-sectional view showing an example of a structure of a cushioning sheet.

FIG. 3 is a cross-sectional view of the cushioning sheet QA when the cushioning sheet QA is cut along a plane having the Y1 direction as a normal direction.

As shown in FIG. 3, the cushioning sheet QA includes a liner LA1, a liner LA2, and a core RA.

The liner LA1 is a flat plate-shaped member formed of paper. The liner LA2 is a flat plate-shaped member formed of paper and is arranged in the Z1 direction of the liner LA1.

The core RA is a corrugated member formed of paper and supports the liner LA1 and the liner LA2 between the liner LA1 and the liner LA2. Specifically, the core RA has a plurality of corrugated portions NA that are periodically arranged.

The corrugated portion NA includes a support body MA1 and a support body MA2. The support body MA1 is fixed to the liner LA1 at a coupling point PA1 and is fixed to the liner LA2 at a coupling point PA2 located in the X1 direction from the coupling point PA1, thereby supporting the liner LA1 and the liner LA2. The support body MA2 is fixed to the liner LA2 at the coupling point PA2 and is fixed to the liner LA1 at a coupling point PA3 located in the X1 direction from the coupling point PA2, thereby supporting the liner LA1 and the liner LA2.

In the present embodiment, the corrugated portion NA is formed such that the length of the support body MA1 is different from the length of the support body MA2.

Specifically, in the present embodiment, as an example, it is assumed that the corrugated portion NA is formed such that the length of the support body MA1 is shorter than the length of the support body MA2. That is, in the present embodiment, as an example, it is assumed that the corrugated portion NA is formed such that the tip portion of the corrugated portion NA has a shape biased in the X2 direction.

In the present embodiment, as an example, it is assumed that, when an external force is applied from an object such as the electronic device 100 located in the Z1 direction when viewed from the cushioning sheet QA, the strength of the corrugated portion NA in the X2 direction against the external force is stronger than the strength of the corrugated portion NA in the X1 direction against the external force. Therefore, in the present embodiment, when an external force is applied from an object such as the electronic device 100 located in the Z1 direction when viewed from the cushioning sheet QA, the corrugated portion NA is more likely to fall down in the X1 direction than in the X2 direction.

In the present embodiment, it is assumed that, when an external force is applied from an object such as the electronic device 100 located in the Z1 direction when viewed from the cushioning sheet QA, the strength of the cushioning sheet QA in the X2 direction is stronger than the strength of the cushioning sheet QA in the X1 direction. However, the present disclosure is not limited to such an aspect. The cushioning sheet QA may be formed such that, when an external force is applied from an object such as the electronic device 100 located in the Z1 direction when viewed from the cushioning sheet QA, the strength of the cushioning sheet QA in the X1 direction is stronger than the strength of the cushioning sheet QA in the X2 direction. That is, the cushioning sheet QA is only required to be formed such that, when an external force is applied from an object such as the electronic device 100 located in the Z1 direction when viewed from the cushioning sheet QA, the strength of the cushioning sheet QA in the X1 direction is different from the strength of the cushioning sheet QA in the X2 direction. In other words, the cushioning sheet QA is only required to be formed such that, when an external force is applied from an object such as the electronic device 100 located in the Z1 direction when viewed from the cushioning sheet QA, a likelihood of the corrugated portion NA falling down in one of the X1 direction and the X2 direction is higher than a likelihood of the corrugated portion NA falling down in the other direction, and the direction in which the corrugated portion NA falls down can be controlled.

Figure 4:
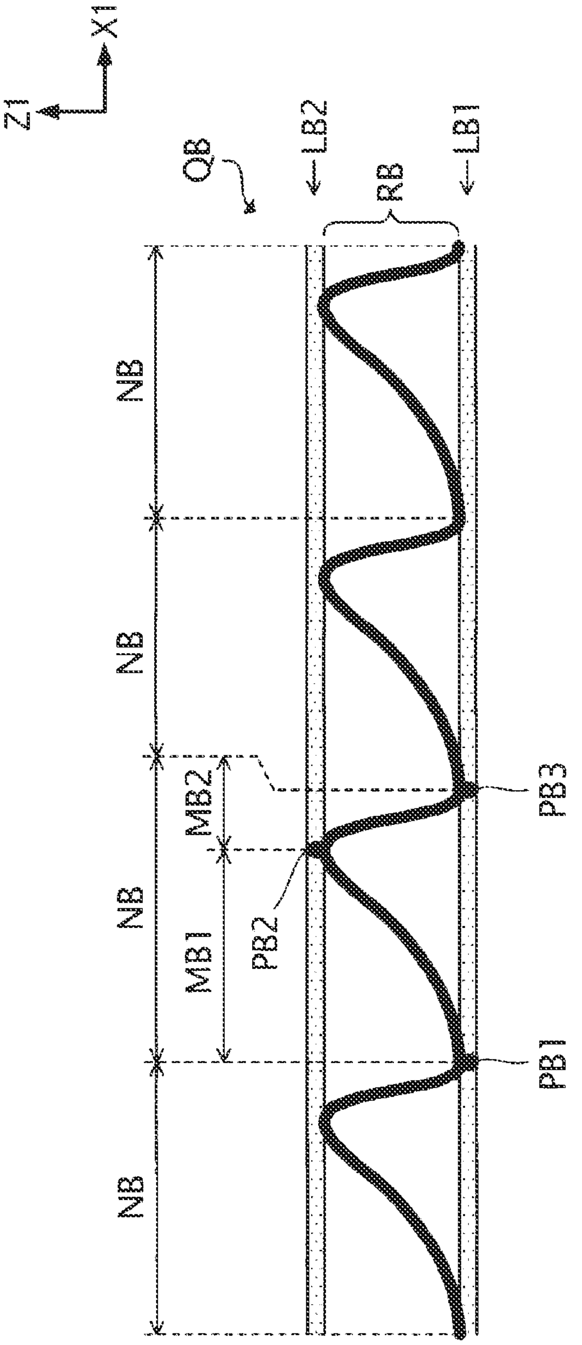
FIG. 4 is a cross-sectional view showing an example of a structure of a cushioning sheet.

FIG. 4 is a cross-sectional view of the cushioning sheet QB when the cushioning sheet QB is cut along a plane having the Y1 direction as a normal direction.

As shown in FIG. 4, the cushioning sheet QB includes a liner LB1, a liner LB2, and a core RB.

The liner LB1 is a flat plate-shaped member formed of paper. The liner LB2 is a flat plate-shaped member formed of paper and is arranged in the Z1 direction of the liner LB1.

The core RB is a corrugated member formed of paper and supports the liner LB1 and the liner LB2 between the liner LB1 and the liner LB2. Specifically, the core RB has a plurality of corrugated portions NB that are periodically arranged.

The corrugated portion NB includes a support body MB1 and a support body MB2. The support body MB1 is fixed to the liner LB1 at a coupling point PB1 and is fixed to the liner LB2 at a coupling point PB2 located in the X1 direction from the coupling point PB1, thereby supporting the liner LB1 and the liner LB2. The support body MB2 is fixed to the liner LB2 at the coupling point PB2 and is fixed to the liner LB1 at a coupling point PB3 located in the X1 direction from the coupling point PB2, thereby supporting the liner LB1 and the liner LB2.

In the present embodiment, the corrugated portion NB is formed such that the length of the support body MB1 is different from the length of the support body MB2.

Specifically, in the present embodiment, as an example, it is assumed that the corrugated portion NB is formed such that the length of the support body MB1 is longer than the length of the support body MB2. That is, in the present embodiment, as an example, it is assumed that the corrugated portion NB is formed such that the tip portion of the corrugated portion NB has a shape biased in the X1 direction.

In the present embodiment, as an example, it is assumed that, when an external force is applied from an object such as the electronic device 100 located in the Z1 direction when viewed from the cushioning sheet QB, the strength of the corrugated portion NB in the X1 direction against the external force is stronger than the strength of the corrugated portion NB in the X2 direction against the external force. Therefore, in the present embodiment, as an example, when an external force is applied from an object such as the electronic device 100 located in the Z1 direction when viewed from the cushioning sheet QB, the corrugated portion NB is more likely to fall down in the X2 direction than in the X1 direction.

In the present embodiment, it is assumed that, when an external force is applied from an object such as the electronic device 100 located in the Z1 direction when viewed from the cushioning sheet QB, the strength of the cushioning sheet QB in the X1 direction is stronger than the strength of the cushioning sheet QB in the X2 direction. However, the present disclosure is not limited to such an aspect. The cushioning sheet QB may be formed such that, when an external force is applied from an object such as the electronic device 100 located in the Z1 direction when viewed from the cushioning sheet QB, the strength of the cushioning sheet QB in the X2 direction is stronger than the strength of the cushioning sheet QB in the X1 direction. That is, the cushioning sheet QB is only required to be formed such that, when an external force is applied from an object such as the electronic device 100 located in the Z1 direction when viewed from the cushioning sheet QB, the strength of the cushioning sheet QB in the X1 direction is different from the strength of the cushioning sheet QB in the X2 direction. In other words, the cushioning sheet QB is only required to be formed such that, when an external force is applied from an object such as the electronic device 100 located in the Z1 direction when viewed from the cushioning sheet QB, a likelihood of the corrugated portion NB falling down in one of the X1 direction and the X2 direction is higher than a likelihood of the corrugated portion NB falling down in the other direction, and the direction in which the corrugated portion NB falls down can be controlled. Specifically, when an external force is applied from an object such as the electronic device 100 located in the Z1 direction when viewed from the cushioning sheet QB, it is sufficient that the direction in which the corrugated portion NB falls down can be controlled such that the corrugated portion NB falls down in the opposite direction to the corrugated portion NA. For example, the cushioning sheet QB may be a sheet obtained by inverting a sheet having the same structure as the cushioning sheet QA in the X-axis direction. The cushioning material K may be stacked, for example, in the order in which the cushioning sheet QA and the cushioning sheet QB are interchanged.

A. 3. Overview of Cushioning Material According to Comparative Example

A cushioning material KT according to a comparative example will be described below with reference to FIGS. 5 to 7.

Figure 5:
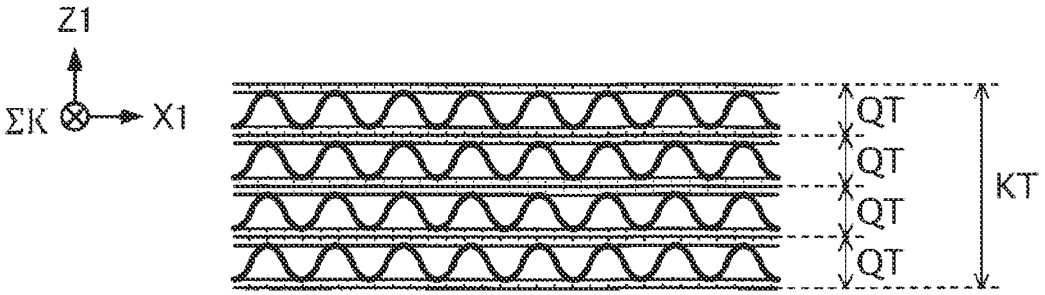
FIG. 5 is a cross-sectional view showing an example of a structure of a cushioning material according to a comparative example.

FIG. 5 is a cross-sectional view of the cushioning material KT when the cushioning material KT is cut along a plane having the Y1 direction as a normal direction.

As shown in FIG. 5, the cushioning material KT has a configuration in which a plurality of cushioning sheets QT are stacked. Here, the cushioning sheet QT is a cushioning sheet Q whose strength in the X1 direction and strength in the X2 direction are substantially the same when an external force is applied from an object such as the electronic device 100 located in the Z1 direction when viewed from the cushioning sheet QT.

Here, "substantially the same" is a concept that includes not only the case of being completely the same but also the case where it can be regarded as the same if an error is considered. In the present embodiment, it is assumed that "substantially the same" is a concept that includes the case where it can be regarded as the same if an error of about 1%, for example, is considered.

Figure 6:
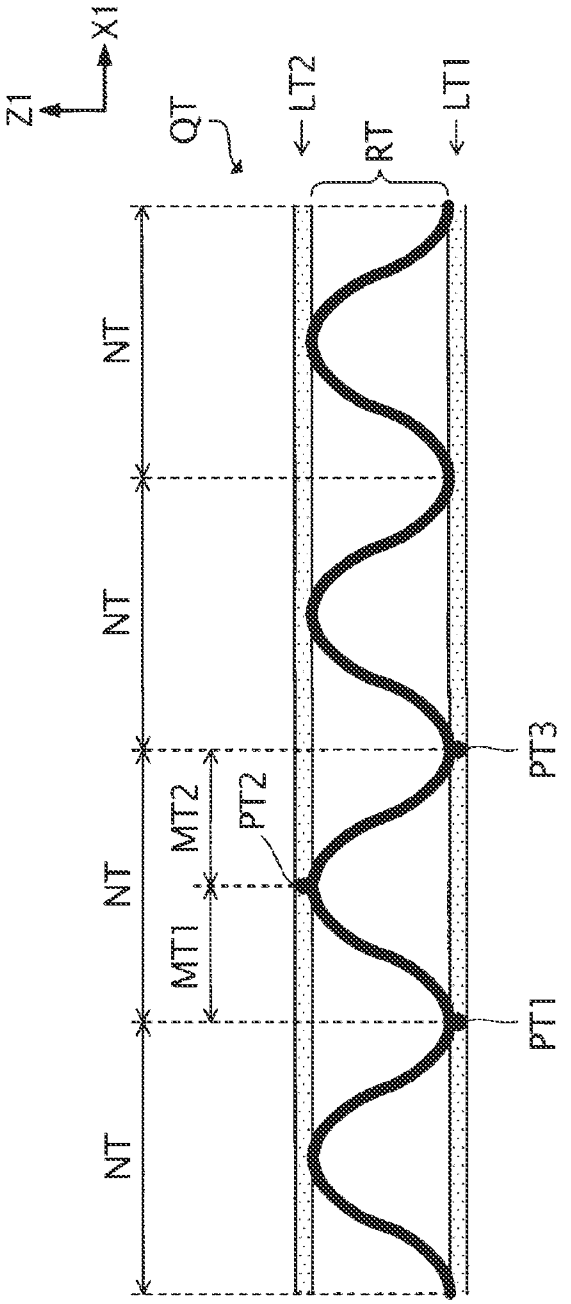
FIG. 6 is a cross-sectional view showing an example of a structure of a cushioning sheet.

FIG. 6 is a cross-sectional view of the cushioning sheet QT when the cushioning sheet QT is cut along a plane having the Y1 direction as a normal direction.

As shown in FIG. 6, the cushioning sheet QT includes a liner LT1, a liner LT2, and a core RT.

The liner LT1 is a flat plate-shaped member formed of paper. The liner LT2 is a flat plate-shaped member formed of paper and is arranged in the Z1 direction of the liner LT1.

The core RT is a corrugated member formed of paper and supports the liner LT1 and the liner LT2 between the liner LT1 and the liner LT2. Specifically, the core RT has a plurality of corrugated portions NT that are periodically arranged.

The corrugated portion NT includes a support body MT1 and a support body MT2. The support body MT1 is fixed to the liner LT1 at a coupling point PT1 and is fixed to the liner LT2 at a coupling point PT2 located in the X1 direction from the coupling point PT1, thereby supporting the liner LT1 and the liner LT2. The support body MT2 is fixed to the liner LT2 at the coupling point PT2 and is fixed to the liner LT1 at a coupling point PT3 located in the X1 direction from the coupling point PT2, thereby supporting the liner LT1 and the liner LT2.

The corrugated portion NT is formed such that the length of the support body MT1 is the substantially the same as the length of the support body MT2. That is, in the comparative example, it is assumed that the corrugated portion NT is formed in a substantially symmetrical shape such that the tip portion of the corrugated portion NT is not biased in the X1 direction and the X2 direction. That is, in the comparative example, it is assumed that, when an external force is applied from an object such as the electronic device 100 located in the Z1 direction when viewed from the cushioning sheet QT, the strength of the corrugated portion NT in the X1 direction against the external force and the strength of the corrugated portion NT in the X2 direction against the external force are substantially the same. Therefore, in the comparative example, when an external force is applied from an object such as the electronic device 100 located in the Z1 direction when viewed from the cushioning sheet QT, it is stochastically determined whether the corrugated portion NT falls down in the X1 direction or in the X2 direction. In other words, in the comparative example, when an external force is applied from an object such as the electronic device 100 located in the Z1 direction when viewed from the cushioning sheet QT, a likelihood of the corrugated portion NT falling down in one of the X1 direction and the X2 direction is substantially the same as a likelihood of the corrugated portion NT falling down in the other direction, making it difficult to control the direction in which the corrugated portion NT falls down.

Figure 7:
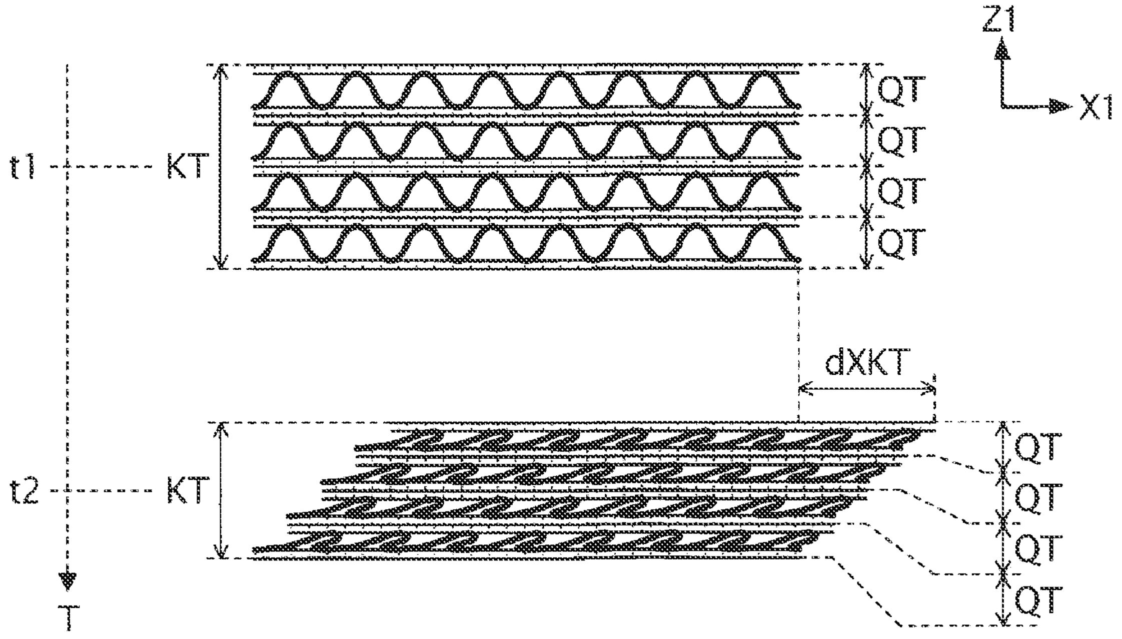
FIG. 7 is an explanatory diagram for describing deformation of the cushioning material shown in FIG. 5.

FIG. 7 is an explanatory diagram for describing deformation of the cushioning material KT when an external force is applied to the cushioning material KT from an object such as the electronic device 100 located in the Z1 direction when viewed from the cushioning material KT. In FIG. 7, time t1 is the time before an external force is applied to the cushioning material KT, and time t2 is the time after the cushioning material KT has been crushed as a result of the external force being applied to the cushioning material KT.

When an external force is applied to the cushioning material KT from an object such as the electronic device 100 located in the Z1 direction when viewed from the cushioning material KT, and the cushioning material KT is crushed, each of the plurality of cushioning sheets QT constituting the cushioning material KT falls down in one of the X1 direction and the X2 direction, which is determined stochastically. When one cushioning sheet QT among the plurality of cushioning sheets QT constituting the cushioning material KT falls down in one of the X1 direction and the X2 direction, other cushioning sheets QT than the one cushioning sheet QT among the plurality of cushioning sheets QT constituting the cushioning material KT may also fall down in one of the X1 direction and the X2 direction. That is, in the comparative example, there is a likelihood that the plurality of cushioning sheets QT constituting the cushioning material KT will fall down in one of the X1 direction and the X2 direction. For example, as shown in FIG. 7, in the comparative example, there is a likelihood that the plurality of cushioning sheets QT constituting the cushioning material KT will fall down in the X1 direction. In this case, the cushioning material KT in a crushed state as a result of the external force being applied has a distorted shape in the X1 direction, and has a width in the X1 direction that is larger by an amount of change dXKT compared with the cushioning material KT before the external force is applied.

Figure 8:
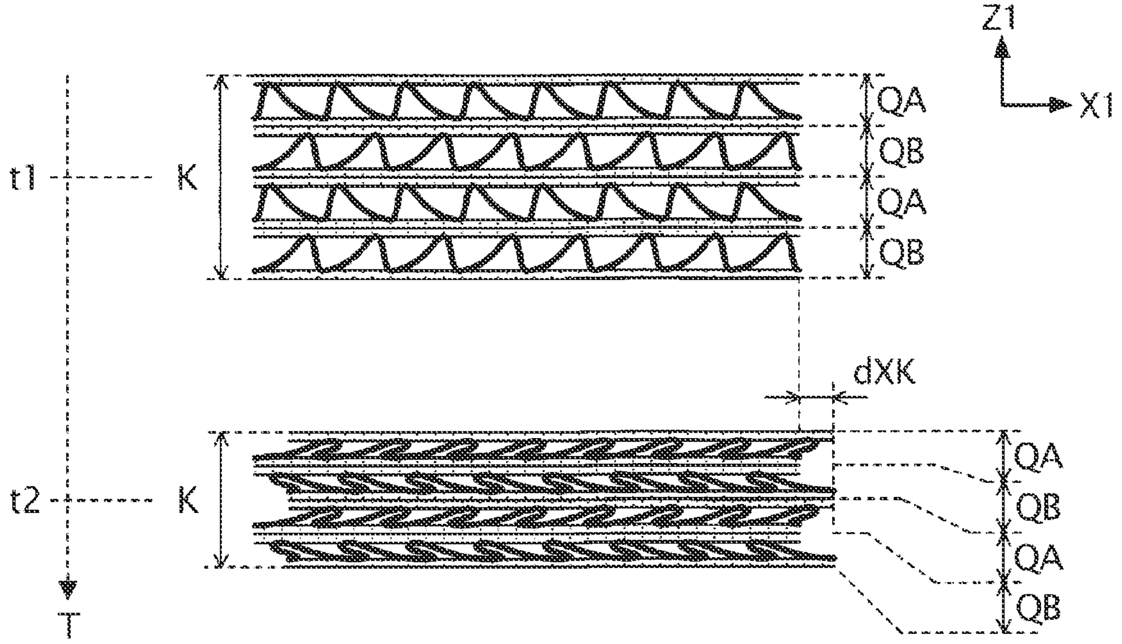
FIG. 8 is an explanatory diagram for describing deformation of the cushioning material shown in FIG. 2.

FIG. 8 is an explanatory diagram for describing deformation of the cushioning material K when an external force is applied to the cushioning material K from an object such as the electronic device 100 located in the Z1 direction when viewed from the cushioning material K according to the present embodiment. In FIG. 8, time t1 is the time before an external force is applied to the cushioning material K, and time t2 is the time after the cushioning material K has been crushed as a result of the external force being applied to the cushioning material K.

As shown in FIG. 8, in the present embodiment, when an external force is applied to the cushioning material K from an object such as the electronic device 100 located in the Z1 direction when viewed from the cushioning material K, the cushioning sheet QA falls down in the X1 direction, and the cushioning sheet QB falls down in the X2 direction. Therefore, the cushioning material K in a crushed state as a result of the external force being applied is in a state in which a plurality of cushioning sheets QA falling down in the X1 direction and a plurality of cushioning sheets QB falling down in the X2 direction are stacked. In this case, the cushioning material K in a crushed state as a result of the external force being applied has a width in the X1 direction that is larger by an amount of change dXK compared with the cushioning material K before the external force is applied. Here, the amount of change dXK is determined based on one or both of the amount of change in the width of the cushioning sheet QA in the X1 direction due to the cushioning sheet QA falling down in the X1 direction, and the amount of change in the width of the cushioning sheet QB in the X1 direction due to the cushioning sheet QB falling down in the X2 direction. For example, it is conceivable that the amount of change dXK is substantially the same value as the amount of change in the width of the cushioning sheet QA in the X1 direction due to the cushioning sheet QA falling down in the X1 direction, and the amount of change in the width of the cushioning sheet QB in the X1 direction due to the cushioning sheet QB falling down in the X2 direction, whichever is larger.

As is clear from FIGS. 7 and 8, the amount of change dXK is smaller than the amount of change dXKT. That is, the amount of change dXK in the width of the cushioning material K crushed by an external force in the X1 direction based on the width of the cushioning material K before being crushed in the X1 direction is smaller than the amount of change dXKT in the width of the cushioning material KT crushed by an external force in the X1 direction based on the width of the cushioning material KT before being crushed in the X1 direction. In other words, the degree of width expansion of the cushioning material KT in the X1 direction due to being crushed is greater than the degree of width expansion of the cushioning material K in the X1 direction due to being crushed.

When the degree of width expansion of the cushioning material KT in the X1 direction due to being crushed is large as in the comparative example, a portion of the cushioning material KT that is expanded in the X1 direction due to being crushed may come into contact with the packaging box 2 in which the cushioning material KT is accommodated, the electronic device 100 accommodated in the packaging box 2 together with the cushioning material KT, or another cushioning material K different from the cushioning material KT among the plurality of cushioning materials K accommodated in the packaging box 2. Therefore, when the degree of width expansion of the cushioning material KT in the X1 direction due to being crushed is large as in the comparative example, due to the influence of the portion of the cushioning material KT that is expanded in the X1 direction due to being crushed, the packaging box 2 in which the cushioning material KT is accommodated, the electronic device 100 accommodated in the packaging box 2 together with the cushioning material KT, or another cushioning material K different from the cushioning material KT among the plurality of cushioning materials K accommodated in the packaging box 2 may be damaged.

On the other hand, in the cushioning material K according to the present embodiment, the degree of width expansion of the cushioning material K in the X1 direction due to being crushed is smaller than that in the cushioning material KT according to the comparative example. Therefore, according to the present embodiment, as compared with the comparative example, when the cushioning material K is crushed, it is possible to reduce a likelihood of damaging the packaging box 2 in which the cushioning material K is accommodated, the electronic device 100 accommodated in the packaging box 2 together with the cushioning material K, or another cushioning material K different from the cushioning material K among the plurality of cushioning materials K accommodated in the packaging box 2. This becomes particularly remarkable when the number of layers included in the cushioning material K increases.

A. 4. Conclusion of First Embodiment

As described above, it is characterized in that the cushioning material K according to the present embodiment is a cushioning material K having a multilayer structure, and includes the cushioning sheet QA whose strength in the X2 direction in which the cushioning sheet Q extends is stronger than a strength in the X1 direction opposite to the X2 direction and the cushioning sheet QB whose strength in the X1 direction is stronger than a strength in the X2 direction.

In the present embodiment, the cushioning sheet QA is an example of a "first layer", the cushioning sheet QB is an example of a "second layer", the X2 direction is an example of a "first direction", and the X1 direction is an example of a "second direction".

In this way, in the present embodiment, the cushioning material K includes the cushioning sheet QA whose strength in the X2 direction is stronger than a strength in the X1 direction and the cushioning sheet QB whose strength in the X1 direction is stronger than a strength in the X2 direction. Therefore, according to the present embodiment, when the cushioning material K is crushed by an external force, it is possible to prevent the cushioning material K from being largely distorted in one of the X1 direction and the X2 direction. Accordingly, according to the present embodiment, it is possible to prevent objects and the like arranged around the cushioning material K from being damaged due to the cushioning material K being largely distorted in one of the X1 direction and the X2 direction.

Also, it may be characterized in that the cushioning material K according to the present embodiment is a cushioning material K in which the plurality of cushioning sheets Q extending in the X1 direction are stacked in the Z1 direction intersecting the X1 direction, the plurality of cushioning sheets Q includes the cushioning sheet QA extending in the X1 direction and the cushioning sheet QB extending in the X1 direction, the cushioning sheet QA includes the flat plate-shaped liner LA1 extending in the X1 direction, the flat plate-shaped liner LA2 located in the Z1 direction when viewed from the liner LA1 and extending in the X1 direction, and the core RA supporting the liner LA1 and the liner LA2 between the liner LA1 and the liner LA2, the cushioning sheet QB includes the flat plate-shaped liner LB1 extending in the X1 direction, the flat plate-shaped liner LB2 located in the Z1 direction when viewed from the liner LB1 and extending in the X1 direction, and the core RB supporting the liner LB1 and the liner LB2 between the liner LB1 and the liner LB2, the strength of the core RA in the X2 direction against an external force applied from the liner LA2 is stronger than the strength in the X1 direction against an external force applied from the liner LA2, and the strength of the core RB in the X1 direction against an external force applied from the liner LB2 is stronger than the strength in the X2 direction against an external force applied from the liner LB2.

Further, it may be characterized in that the cushioning material K according to the present embodiment includes the plurality of cushioning sheets QA and the plurality of cushioning sheets QB, and the cushioning sheets QA and the cushioning sheets QB are alternately arranged in the cushioning material K.

Therefore, according to the present embodiment, when the cushioning material K is crushed by an external force, it is possible to prevent the cushioning material K from being largely distorted in one of the X1 direction and the X2 direction.

Further, it may be characterized in that, in the cushioning material K according to the present embodiment, the cushioning sheet QA includes the flat plate-shaped liner LA1 extending in the X1 direction, the flat plate-shaped liner LA2 extending in the X1 direction, and the core RA provided between the liner LA1 and the liner LA2, the core RA includes the support body MA1 coupled to the liner LA1 at the coupling point PA1 and coupled to the liner LA2 at the coupling point PA2 located in the X1 direction from the coupling point PA1, and the support body MA2 coupled to the liner LA2 at the coupling point PA2 and coupled to the liner LA1 at the coupling point PA3 located in the X1 direction from the coupling point PA2, and the length of the support body MA1 and the length of the support body MA2 are different.

In the present embodiment, the liner LA1 is an example of a "first flat plate portion", the liner LA2 is an example of a "second flat plate portion", the core RA is an example of a "support portion", the support body MA1 is an example of a "first support body", the support body MA2 is an example of a "second support body", the coupling point PA1 is an example of a "first coupling point", the coupling point PA2 is an example of a "second coupling point", and the coupling point PA3 is an example of a "third coupling point".

In this way, according to the present embodiment, the length of the support body MA1 and the length of the support body MA2 are different. Therefore, according to the present embodiment, the strength of the cushioning sheet QA in the X1 direction and the strength of the cushioning sheet QA in the X2 direction can be made different. Accordingly, according to the present embodiment, when an external force is applied to the cushioning sheet QA, it is possible to control the direction in which the core RA falls down.

Further, it may be characterized in that, in the cushioning material K according to the present embodiment, the cushioning sheet QA includes the flat plate-shaped liner LA1 extending in the X1 direction, the flat plate-shaped liner LA2 extending in the X1 direction, and the core RA provided between the liner LA1 and the liner LA2, the core RA alternately includes the support body MA1 coupling the liner LA1 and the liner LA2 and the support body MA2 coupling the liner LA1 and the liner LA2 and having a length different from the support body MA1.

Therefore, according to the present embodiment, the strength of the cushioning sheet QA in the X1 direction and the strength of the cushioning sheet QA in the X2 direction can be made different. Accordingly, according to the present embodiment, when an external force is applied to the cushioning sheet QA, it is possible to control the direction in which the core RA falls down.

Further, it may be characterized in that, in the cushioning material K according to the present embodiment, the number of cushioning sheets QA and the number of cushioning sheets QB included in the multilayer structure are equal to each other.

Therefore, according to the present embodiment, as compared with an aspect in which the number of the cushioning sheets QA and the number of the cushioning sheets QB included in the cushioning material K are different from each other, it is possible to reduce the degree of expansion of the cushioning material K in the X1 direction when the cushioning material K is crushed. Accordingly, according to the present embodiment, it is possible to prevent objects and the like arranged around the cushioning material K from being damaged due to the cushioning material K being largely distorted in one of the X1 direction and the X2 direction.

A. 5. Modification Example of First Embodiment

Each of the aspects illustrated in the first embodiment can be variously modified. A specific aspect of modification is illustrated below. Any two or more aspects selected from the above-described embodiment and the following examples can be combined as appropriate as long as there is no contradiction.

Modification Example A1

In the first embodiment described above, a case where the direction in which the cushioning sheet QA including the support body MA1 and the support body MA2 falls down is controlled by making the lengths of the support body MA1 and the support body MA2 different has been described as an example, but the present disclosure is not limited to such an aspect. The cushioning sheet may be formed with another structure. For example, the direction in which the cushioning sheet Q falls down may be controlled by making the materials of the two support bodies constituting each of the plurality of corrugated portions included in the core of the cushioning sheet Q different.

Figure 9:
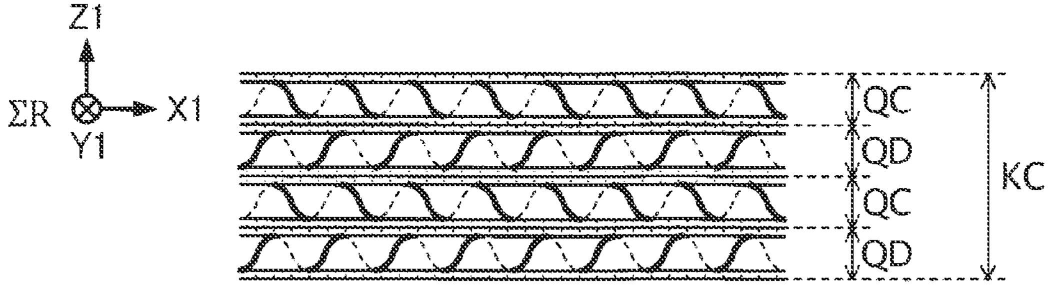
FIG. 9 is a cross-sectional view showing an example of a structure of a cushioning material.

FIG. 9 is a cross-sectional view of a cushioning material KC according to the present modification example when the cushioning material KC is cut along a plane having the Y1 direction as a normal direction. The cushioning material KC is used to form the support material S instead of the cushioning material K in FIG. 1.

As shown in FIG. 9, the cushioning material KC has a configuration in which a plurality of cushioning sheets QC and a plurality of cushioning sheets QD are stacked. Here, the cushioning sheet QC is a cushioning sheet Q whose strength in the X1 direction is stronger than a strength in the X2 direction when an external force is applied from an object such as the electronic device 100 located in the Z1 direction when viewed from the cushioning sheet QC. Further, the cushioning sheet QD is a cushioning sheet Q whose strength in the X2 direction is stronger than a strength in the X1 direction when an external force is applied from an object such as the electronic device 100 located in the Z1 direction when viewed from the cushioning sheet QD.

As shown in FIG. 9, in the present modification example, a case where the cushioning material KC has a configuration in which a plurality of cushioning sheets QC and a plurality of cushioning sheets QD are alternately stacked is assumed as an example. However, the present disclosure is not limited to such an aspect. For example, the cushioning sheet Q different from the cushioning sheet QC and the cushioning sheet QD, for example, the cushioning sheet QT may be stacked between one cushioning sheet QC among the plurality of cushioning sheets QC and one cushioning sheet QD closest to the one cushioning sheet QC among the plurality of cushioning sheets QD.

Also, in the present modification example, a case where the number of cushioning sheets QC included in the cushioning material KC and the number of cushioning sheets QD included in the cushioning material KC are the same is assumed as an example. However, the present disclosure is not limited to such an aspect. For example, the number of cushioning sheets QC included in the cushioning material KC and the number of cushioning sheets QD included in the cushioning material KC may be different.

Figure 10:
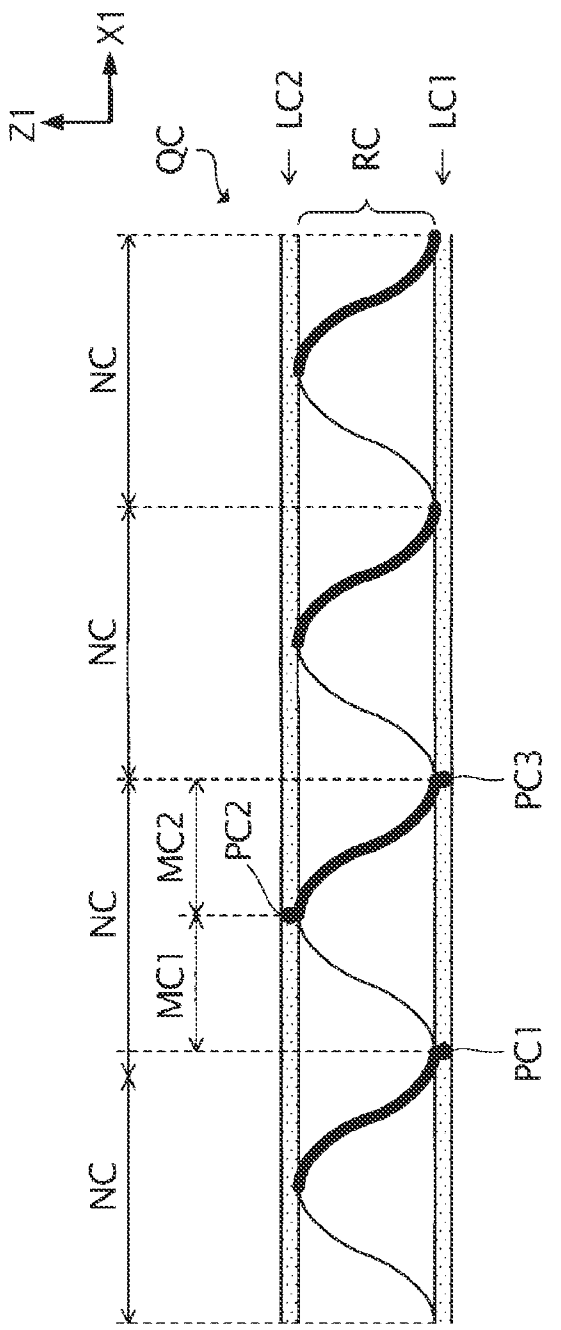
FIG. 10 is a cross-sectional view showing an example of a structure of a cushioning sheet.

FIG. 10 is a cross-sectional view of the cushioning sheet QC when the cushioning sheet QC is cut along a plane having the Y1 direction as a normal direction.

As shown in FIG. 10, the cushioning sheet QC includes a liner LC1, a liner LC2, and a core RC.

The liner LC1 is a flat plate-shaped member formed of paper. The liner LC2 is a flat plate-shaped member formed of paper and is arranged in the Z1 direction of the liner LC1.

The core RC is a corrugated member formed of paper strained such that the thickness thereof changes periodically and supports the liner LC1 and the liner LC2 between the liner LC1 and the liner LC2. The thickness of the core RC is not limited to one that changes in thickness as long as the strength changes periodically, and the material other than the thickness, such as the concentration of additives, may be changed. In the present embodiment, the core RC has, for example, a plurality of corrugated portions NC that are periodically arranged.

The corrugated portion NC includes a support body MC1 and a support body MC2. The support body MC1 is fixed to the liner LC1 at a coupling point PC1 and is fixed to the liner LC2 at a coupling point PC2 located in the X1 direction from the coupling point PC1, thereby supporting the liner LC1 and the liner LC2. The support body MC2 is fixed to the liner LC2 at the coupling point PC2 and is fixed to the liner LC1 at a coupling point PC3 located in the X1 direction from the coupling point PC2, thereby supporting the liner LC1 and the liner LC2.

In the present modification example, the corrugated portion NC is formed such that the strength of the support body MC1 is different from the strength of the support body MC2. Specifically, in the present modification example, as an example, it is assumed that the corrugated portion NC is formed such that the thickness of the support body MC2 is thicker than the thickness of the support body MC1. Therefore, in the present modification example, when an external force is applied from an object such as the electronic device 100 located in the Z1 direction when viewed from the cushioning sheet QC, the strength of the corrugated portion NC in the X1 direction against the external force is stronger than the strength of the corrugated portion NC in the X2 direction against the external force. Therefore, in the present modification example, when an external force is applied from an object such as the electronic device 100 located in the Z1 direction when viewed from the cushioning sheet QC, the corrugated portion NC is more likely to fall down in the X2 direction than in the X1 direction. That is, in the present modification example, the cushioning sheet QC is formed such that, when an external force is applied from an object such as the electronic device 100 located in the Z1 direction when viewed from the cushioning sheet QC, a likelihood of the corrugated portion NC falling down in one of the X1 direction and the X2 direction is higher than a likelihood of the corrugated portion NC falling down in the other direction, and the direction in which the corrugated portion NC falls down can be controlled.

Figure 11:
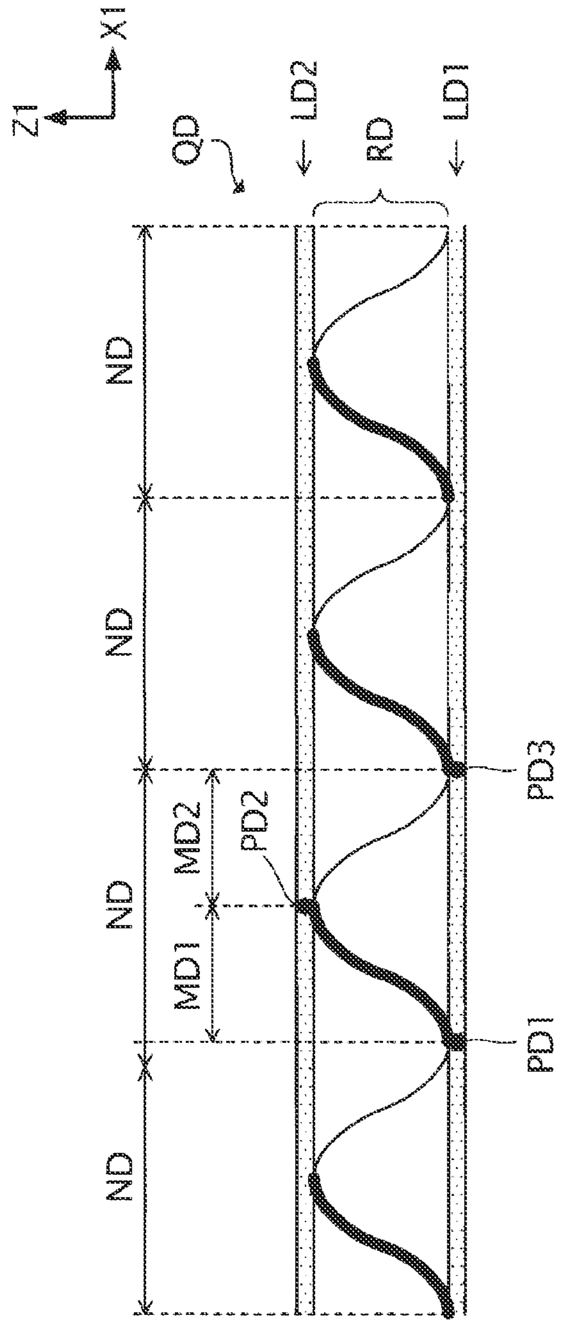
FIG. 11 is a cross-sectional view showing an example of a structure of a cushioning sheet.

FIG. 11 is a cross-sectional view of the cushioning sheet QD when the cushioning sheet QD is cut along a plane having the Y1 direction as a normal direction.

As shown in FIG. 11, the cushioning sheet QD includes a liner LD1, a liner LD2, and a core RD.

The liner LD1 is a flat plate-shaped member formed of paper. The liner LD2 is a flat plate-shaped member formed of paper and is arranged in the Z1 direction of the liner LD1.

The core RD is a corrugated member formed of paper strained such that the thickness thereof changes periodically and supports the liner LD1 and the liner LD2 between the liner LD1 and the liner LD2. The thickness of the core RD is not limited to one that changes in thickness as long as the strength changes periodically, and the material other than the thickness, such as the concentration of additives, may be changed. In the present embodiment, the core RD has, for example, a plurality of corrugated portions ND that are periodically arranged.

The corrugated portion ND includes a support body MD1 and a support body MD2. The support body MD1 is fixed to the liner LD1 at a coupling point PD1 and is fixed to the liner LD2 at a coupling point PD2 located in the X1 direction from the coupling point PD1, thereby supporting the liner LD1 and the liner LD2. The support body MD2 is fixed to the liner LD2 at the coupling point PD2 and is fixed to the liner LD1 at a coupling point PD3 located in the X1 direction from the coupling point PD2, thereby supporting the liner LD1 and the liner LD2.

In the present modification example, the corrugated portion ND is formed such that the strength of the support body MD1 is different from the strength of the support body MD2. Specifically, in the present modification example, as an example, it is assumed that the corrugated portion ND is formed such that the thickness of the support body MD1 is thicker than the thickness of the support body MD2. Therefore, in the present modification example, when an external force is applied from an object such as the electronic device 100 located in the Z1 direction when viewed from the cushioning sheet QD, the strength of the corrugated portion ND in the X2 direction against the external force is stronger than the strength of the corrugated portion ND in the X1 direction against the external force. Therefore, in the present modification example, when an external force is applied from an object such as the electronic device 100 located in the Z1 direction when viewed from the cushioning sheet QD, the corrugated portion ND is more likely to fall down in the X1 direction than in the X2 direction. That is, in the present modification example, the cushioning sheet QD is formed such that, when an external force is applied from an object such as the electronic device 100 located in the Z1 direction when viewed from the cushioning sheet QD, a likelihood of the corrugated portion ND falling down in one of the X1 direction and the X2 direction is higher than a likelihood of the corrugated portion ND falling down in the other direction, and the direction in which the corrugated portion ND falls down can be controlled.

In the present modification example, when an external force is applied to the cushioning material KC from an object such as the electronic device 100 located in the Z1 direction when viewed from the cushioning material KC, the cushioning sheet QC falls down in the X2 direction, and the cushioning sheet QD falls down in the X1 direction. Therefore, according to the present modification example, the amount of change in the width of the cushioning material KC crushed by an external force in the X1 direction based on the width of the cushioning material KC before being crushed in the X1 direction can be made smaller than the amount of change dXKT in the width of the cushioning material KT crushed by an external force in the X1 direction based on the width of the cushioning material KT before being crushed in the X1 direction. That is, in the cushioning material KC according to the present modification example, the degree of width expansion of the cushioning material KC in the X1 direction due to being crushed is smaller than that in the cushioning material KT according to the comparative example. Therefore, according to the present modification example, as compared with the comparative example, when the cushioning material KC is crushed, it is possible to reduce a likelihood of damaging the packaging box 2 in which the cushioning material KC is accommodated, the electronic device 100 accommodated in the packaging box 2 together with the cushioning material KC, or another cushioning material K different from the cushioning material KC among the plurality of cushioning materials K accommodated in the packaging box 2. The cushioning sheet may be formed by other methods as long as the way in which the cushioning sheet falls down can be controlled in this way. For example, a cushioning sheet that is about to fall down in the X1 direction may be formed by applying a force in the Z1 direction while applying a force in the X1 direction to the liner LT1 of the cushioning sheet QT. In other words, the cushioning sheet of the present modification example is formed by intentionally causing a so-called "step flow".

Modification Example A2

In the first embodiment and the modification example described above, the aspect in which the support material S formed by the cushioning material K or the cushioning material KC is accommodated in the packaging box 2 has been described as an example, but the present disclosure is not limited to such an aspect. The packaging box 2 may include one or both of the cushioning material K and the cushioning material KC.

That is, it is characterized in that the packaged product according to the present modification example includes the packaging box 2 configured by the cushioning material K having a multilayer structure, and the electronic device 100 packed in the packaging box 2, and the multilayer structure constituting the packaging box 2 includes the cushioning sheet QA whose strength in the X2 direction in which the cushioning material K extends is stronger than a strength in the X1 direction opposite to the X2 direction, and the cushioning sheet QB whose strength in the X1 direction is stronger than a strength in the X2 direction.

Therefore, according to the present modification example, when the packaging box 2 is crushed by an external force, it is possible to prevent the packaging box 2 from being largely distorted in one of the X1 direction and the X2 direction.

Modification Example A3

In addition, in the first embodiment and the modification example described above, the cushioning sheet QA whose strength in the X2 direction in which the cushioning material K extends is stronger than a strength in the X1 direction opposite to the X2 direction, and the cushioning sheet QB whose strength in the X1 direction is stronger than a strength in the X2 direction are alternately stacked, but the present disclosure is not limited thereto. For example, two layers of the cushioning sheet QA may be continued, and then two layers of the cushioning sheet QB may be continued. Also, the number of cushioning sheets QA included in the cushioning material K may be different from the number of cushioning sheets QB. If the difference in the numbers is small, the distortion of the cushioning material K as a whole can be small. Therefore, for example, a five-layer structure in which the cushioning sheet QA, the cushioning sheet QB, the cushioning sheet QA, the cushioning sheet QB, and the cushioning sheet QA are stacked in that order may be used. Similarly, a cushioning sheet QT in the related art may be included in a part of the cushioning material K. No matter how the cushioning sheet QT falls down, it is possible to control how the cushioning sheet QA and the cushioning sheet QB, which constitute other parts, fall down, and thus it is possible to prevent the shape from being greatly distorted as a whole.

B. Second Embodiment

A cushioning material according to a second embodiment will be described below with reference to FIGS. 12 to 16. In each embodiment illustrated below, elements whose actions and functions are similar to those of the first embodiment will be denoted by the same reference numerals used in the description of the first embodiment and detailed description thereof will be omitted as appropriate.

B. 1. Overview of Cushioning Material According to Second Embodiment

Figure 12:
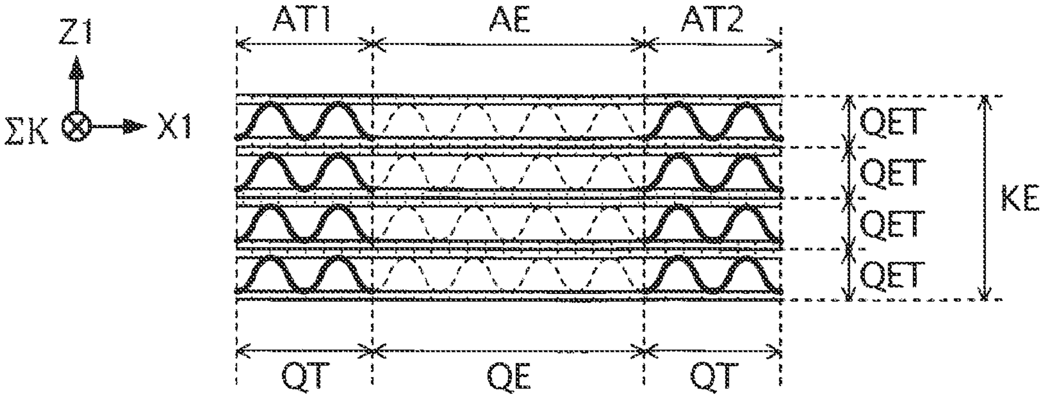
FIG. 12 is an exploded perspective view showing an example of a configuration of a cushioning material according to a second embodiment of the present disclosure.

FIG. 12 is a cross-sectional view of the cushioning material KE according to the second embodiment when the cushioning material KE is cut along a plane having a normal direction in the Y1 direction. The cushioning material KE is used to form the support material S instead of the cushioning material K in FIG. 1.

As shown in FIG. 12, the cushioning material KE has a configuration in which a plurality of cushioning sheets QET are stacked. Here, the cushioning sheet QET includes the cushioning sheet QT and the cushioning sheet QE according to the comparative example described above. Specifically, the cushioning sheet QET includes a cushioning sheet QT arranged in an area AT1 in the X1 direction, a cushioning sheet QT arranged in an area AT2 located in the X1 direction from the area AT1, and a cushioning sheet QE arranged to couple the cushioning sheet QT arranged in the area A11 and the cushioning sheet QT arranged in the area AT2 in an area AE between the area A11 and the area AT2. In the present embodiment, the strength of the cushioning sheet QE in the Z1 direction is weaker than the strength of the cushioning sheet QT in the Z1 direction.

Figure 13:
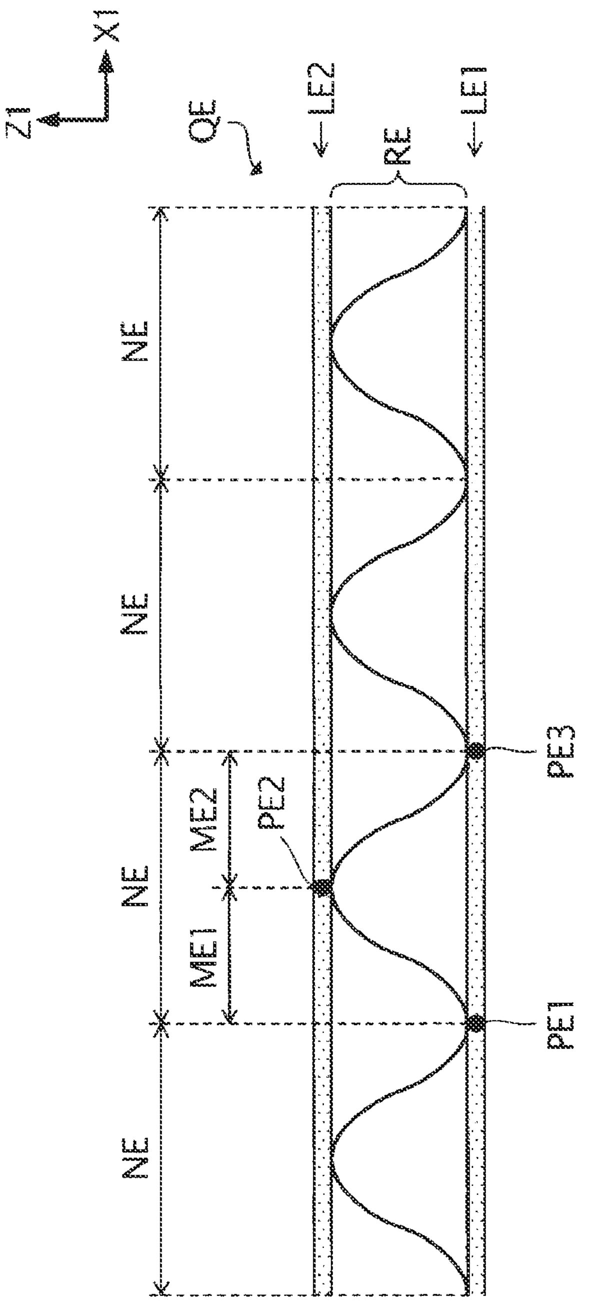
FIG. 13 is a cross-sectional view showing an example of a structure of a cushioning sheet.

FIG. 13 is a cross-sectional view of the cushioning sheet QE when the cushioning sheet QE is cut along a plane having the Y1 direction as a normal direction.

As shown in FIG. 13, the cushioning sheet QE includes a liner LE1, a liner LE2, and a core RE.

The liner LE1 is a flat plate-shaped member formed of paper. The liner LE2 is a flat plate-shaped member formed of paper and is arranged in the Z1 direction of the liner LE1.

The core RE is a corrugated member formed of paper and supports the liner LE1 and the liner LE2 between the liner LE1 and the liner LE2. Specifically, the core RE has a plurality of corrugated portions NE that are periodically arranged.

The corrugated portion NE includes a support body ME1 and a support body ME2. The support body ME1 is fixed to the liner LE1 at a coupling point PE1 and is fixed to the liner LE2 at a coupling point PE2 located in the X1 direction from the coupling point PE1, thereby supporting the liner LE1 and the liner LE2. The support body ME2 is fixed to the liner LE2 at the coupling point PE2 and is fixed to the liner LE1 at a coupling point PE3 located in the X1 direction from the coupling point PE2, thereby supporting the liner LE1 and the liner LE2.

Also, in the present embodiment, the corrugated portion NE is formed such that the length of the support body ME1 is substantially the same as the length of the support body ME2. However, the corrugated portion NE may be formed such that the length of the support body ME1 is different from the length of the support body ME2.

Further, in the present embodiment, it is assumed that the strength of the paper forming the core RE of the cushioning sheet QE is weaker than the strength of the paper forming the core RT of the cushioning sheet QT. Specifically, in the present embodiment, it is assumed that the thickness of the paper forming the core RE is thinner than the thickness of the paper forming the core RT. Therefore, in the present embodiment, the strength of the cushioning sheet QE is weaker than the strength of the cushioning sheet QT.

Figure 14:
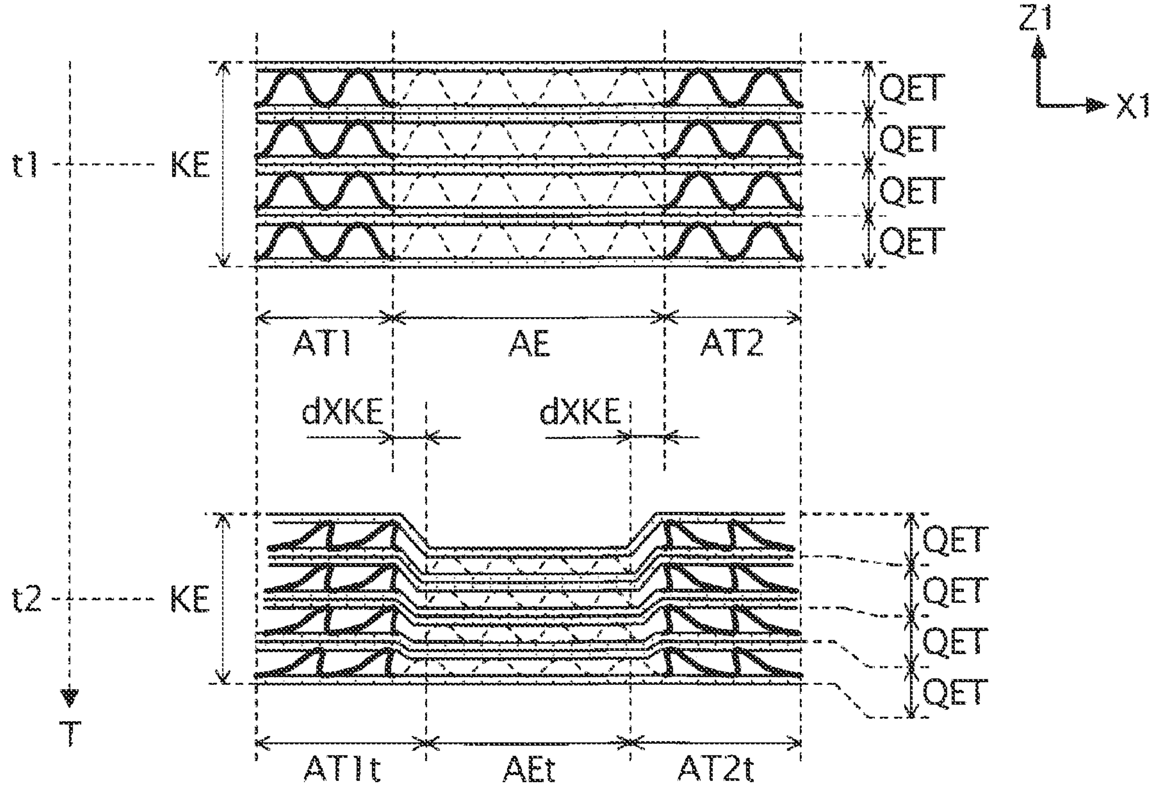
FIG. 14 is an explanatory diagram for describing deformation of the cushioning material shown in FIG. 12.

FIG. 14 is an explanatory diagram for describing deformation of the cushioning material KE when an external force is applied to the cushioning material KE from an object such as the electronic device 100 located in the Z1 direction when viewed from the cushioning material KE. In FIG. 14, time t1 is the time before an external force is applied to the cushioning material KE, and time t2 is the time after the cushioning material KE has been crushed as a result of the external force being applied to the cushioning material KE.

When an external force is applied to the cushioning material KE from an object such as the electronic device 100 located in the Z1 direction when viewed from the cushioning material KE, a cushioning sheet QE having a weak strength among the plurality of cushioning sheets QET constituting the cushioning material KE is crushed preferentially over a cushioning sheet QT having a strong strength. Therefore, the cushioning sheet QT arranged in the area AT1 is crushed in a shape inclined in the X2 direction to be dragged by the cushioning sheet QE crushed by an external force, and the cushioning sheet QT arranged in the area AT2 is crushed in a shape inclined in the X1 direction to be dragged by the cushioning sheet QE crushed by an external force.

Specifically, the cushioning sheet QT arranged in the area A11 before the cushioning material KE is crushed is in a crushed state in an area Alit that is expanded in the X1 direction by the amount of change dXKE from the area A11, and the cushioning sheet QT arranged in the area AT2 before the cushioning material KE is crushed is in a crushed state in an area AT2*t* that is expanded in the X2 direction by the amount of change dXKE from the area AT2. However, the end portion of the area Alit in the X2 direction maintains substantially the same position as the end portion of the area A11 in the X2 direction, and the end portion of the area AT2*t* in the X1 direction is substantially the same position as the end portion of the area AT2 in the X1 direction. That is, in the present embodiment, the width of the cushioning material KE before being crushed by the external force in the X1 direction and the width of the cushioning material KE after being crushed by the external force in the X1 direction are substantially the same.

As described above, in the present embodiment, the degree of width expansion of the cushioning material KE in the X1 direction due to being crushed by an external force is smaller than the degree of width expansion of the cushioning material KT in the X1 direction due to being crushed by an external force. Therefore, according to the present embodiment, as compared with the comparative example, when the cushioning material KE is crushed, it is possible to reduce a likelihood of damaging the packaging box 2 in which the cushioning material KE is accommodated, the electronic device 100 accommodated in the packaging box 2 together with the cushioning material KE, or another cushioning material K different from the cushioning material KE among the plurality of cushioning materials K accommodated in the packaging box 2.

B. 2. Conclusion of Second Embodiment

As described above, it is characterized in that the cushioning sheet QET according to the present embodiment is the cushioning sheet QET, and includes the cushioning sheet QE provided in the area AE and the cushioning sheet QT provided in the area A11 and the area AT2 and having a strength stronger than that of the cushioning sheet QE.

In the present embodiment, the cushioning sheet QE is an example of a "first portion", the cushioning sheet QT is an example of a "second portion", the area A11 is an example of a "first area", and the area AT2 is an example of a "second area".

In this way, in the present embodiment, the cushioning sheet QET includes the cushioning sheet QE and the cushioning sheet QT having a strength stronger than that of the cushioning sheet QE. Therefore, according to the present embodiment, when the cushioning material KE configured by the cushioning sheet QET is crushed by an external force, it is possible to prevent the cushioning material KE from being largely distorted in one of the X1 direction and the X2 direction. Accordingly, according to the present embodiment, it is possible to prevent objects and the like arranged around the cushioning material KE from being damaged due to the cushioning material K being largely distorted in one of the X1 direction and the X2 direction.

Further, it may be characterized in that, in the cushioning sheet QET according to the present embodiment, the cushioning sheet QE includes the flat plate-shaped liner LE1 and the core RE attached to the liner LE1, the cushioning sheet QT includes the flat plate-shaped liner LT1 extending in the plane on which the liner LE1 is provided and the core RT attached to the liner LT1, the core RE is formed of paper, and the core RT is formed of paper different from the paper forming the core RE.

In the present embodiment, the liner LE1 is an example of a "first flat plate portion", the liner LT1 is an example of a "second flat plate portion", the core RE is an example of a "first support portion", the core RT is an example of a "second support portion", the plane on which the liner LE1 extends is an example of a "first plane", the paper forming the core RE is an example of a "first member", and the paper forming the core RT is an example of a "second member".

In this way, according to the present embodiment, the paper forming the core RE of the cushioning sheet QE and the paper forming the core RT of the cushioning sheet QT are different from each other. Therefore, according to the present embodiment, the strength of the cushioning sheet QE and the strength of the cushioning sheet QT can be set to different strengths.

Further, it may be characterized in that, in the cushioning sheet QET according to the present embodiment, the area A11 and the area AT2 are the areas closer to the end portion of the cushioning sheet QET than the area AE.

Therefore, according to the present embodiment, when the cushioning material KE configured by the cushioning sheet QET is crushed by an external force, the cushioning sheet QT provided in the area A11 and the cushioning sheet QT provided in the area AT2 are crushed to fall down toward the area AE where the cushioning sheet QE is formed. Accordingly, according to the present embodiment, when the cushioning material KE configured by the cushioning sheet QET is crushed by an external force, it is possible to prevent the cushioning material KE from being largely distorted in one of the X1 direction and the X2 direction.

B. 3. Modification Example of Second Embodiment

Each of the aspects illustrated in the second embodiment can be variously modified. A specific aspect of modification is illustrated below. Any two or more aspects selected from the above-described embodiment and the following examples can be combined as appropriate as long as there is no contradiction.

Modification Example B1

In the second embodiment described above, a case where the cushioning material KE includes a plurality of cushioning sheets QET has been described as an example, but the cushioning material KE may include a cushioning sheet QET and a cushioning sheet Q other than the cushioning sheet QET.

Figure 15:
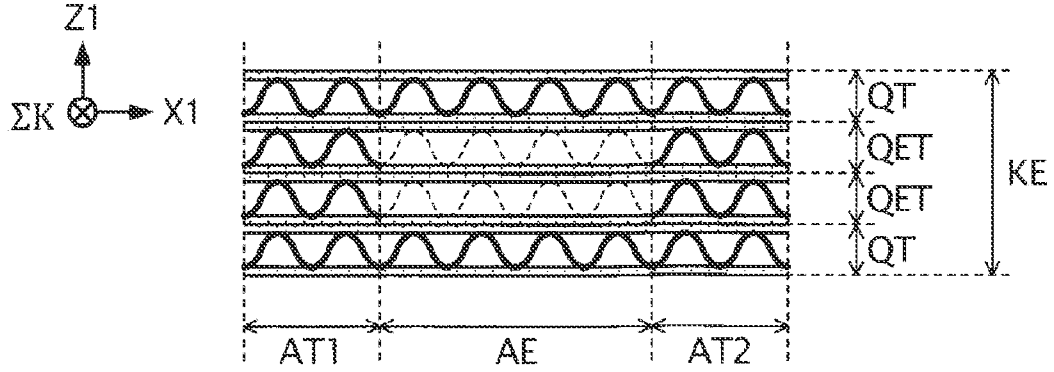
FIG. 15 is a cross-sectional view showing an example of a structure of the cushioning material shown in FIG. 12.

FIG. 15 is a cross-sectional view of a cushioning material KE according to the present modification example when the cushioning material KE is cut along a plane having the Y1 direction as a normal direction. The cushioning material KE according to the present modification example is used to form the support material S instead of the cushioning material K in FIG. 1.

As shown in FIG. 15, the cushioning material KE according to the present modification example has a configuration in which a plurality of cushioning sheets QET and a plurality of cushioning sheets QT are stacked. Also in the present modification example, the cushioning material KE includes the cushioning sheet QET. Therefore, according to the present modification example, when the cushioning material KE is crushed by an external force, it is possible to prevent the cushioning material KE from being largely distorted in one of the X1 direction and the X2 direction.

Modification Example B2

In the second embodiment and the modification example described above, a case where the paper forming the core RE of the cushioning sheet QE included in the cushioning sheet QET and the core RT of the cushioning sheet QT included in the cushioning sheet QET are different has been described as an example, but the present disclosure is not limited to such an aspect. The paper forming the core RE of the cushioning sheet QE included in the cushioning sheet QET and the paper forming the core RT of the cushioning sheet QT included in the cushioning sheet QET may be the same paper.

Figure 16:
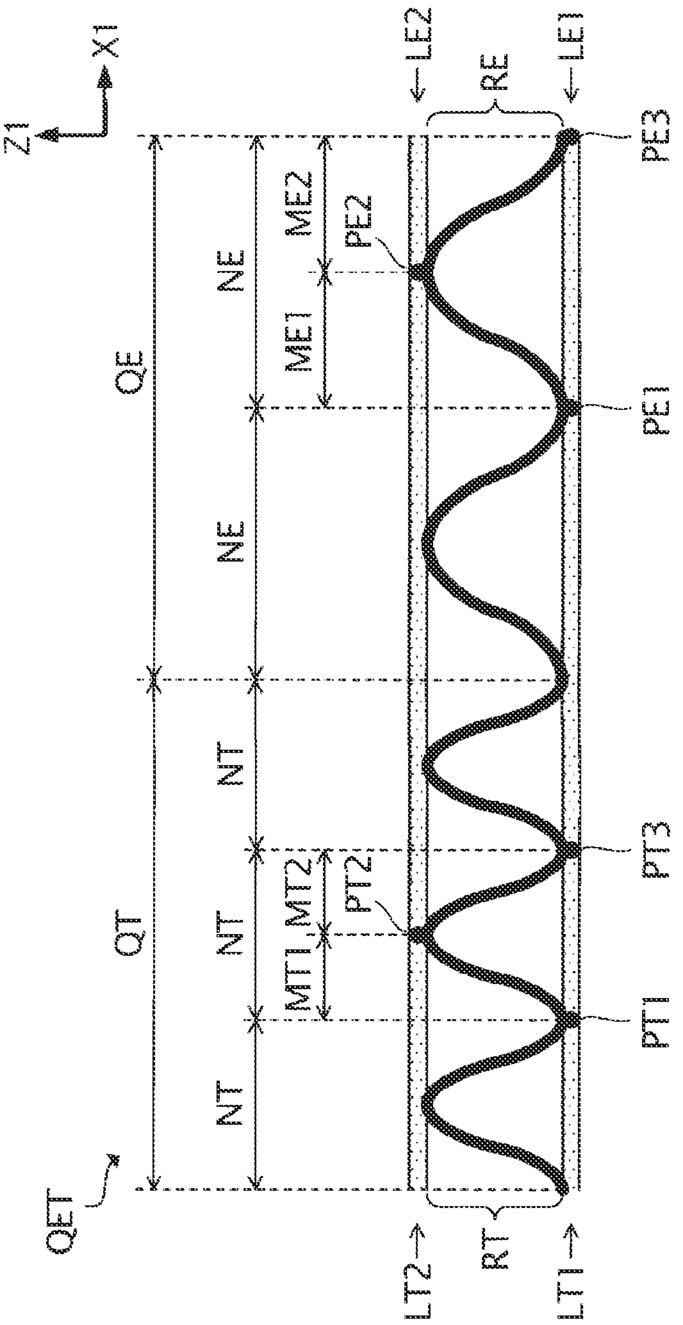
FIG. 16 is a cross-sectional view showing an example of a structure of a cushioning sheet.

FIG. 16 is a cross-sectional view of the cushioning sheet QET according to the present modification example when the cushioning sheet QET is cut along a plane having the Y1 direction as a normal direction.

As shown in FIG. 16, in the present modification example, the cushioning sheet QET includes a cushioning sheet QE having a core RE supporting the liner LE1 and the liner LE2, and a cushioning sheet QT having a core RT supporting the liner LT1 and the liner LT2. In the present modification example, the core RE and the core RT are formed of the same paper. In the present modification example, the width of the corrugated portion NE of the core RE in the X1 direction is wider than the width of the corrugated portion NT of the core RT in the X1 direction. In other words, in the present modification example, the core RE and the core RT are formed such that the corrugation of the paper forming the core RT has a higher density than the corrugation of the paper forming the core RE. The density of the core may be constant in each of the core RT portion and the core RE portion, but the density of the core may gradually decrease from the core RT portion to the core RE portion. In this case, when the density of the core is represented by the vertical axis and the position in the X1 direction is represented by the horizontal axis, the density may be continuously changed so as to form a wavy shape.

In the present modification example, the liner LE1 and the liner LT1 may be formed of the same paper. Further, in the present modification example, the liner LE2 and the liner LT2 may be formed of the same paper.

As described above, it is characterized in that, in the cushioning sheet QET according to the present modification example, the cushioning sheet QE includes the flat plate-shaped liner LE1 and the core RE attached to the liner LE1, the cushioning sheet QT includes the flat plate-shaped liner LT1 extending in the plane on which the liner LE1 is provided and the core RT attached to the liner LT1, core RE is formed of a sheet of paper or the like folded into a corrugated shape, and the core RT is formed of a sheet of paper or the like folded into a corrugated shape having a higher density than the core RE.

Therefore, according to the present modification example, the strength of the cushioning sheet QT can be made stronger than that of the cushioning sheet QE, and when the cushioning material KE configured by the cushioning sheet QET is crushed by an external force, it is possible to prevent the cushioning material KE from being largely distorted in one of the X1 direction and the X2 direction.

Further, in the cushioning sheet QET according to the present modification example, the core RE and the core RT may be provided so that the density gradually increases from the core RE to the core RT.

Further, it may be characterized in that, in the cushioning sheet QET according to the present modification example, the sheet forming the core RE is the same sheet as the sheet forming the core RT.

Modification Example B3

In the second embodiment and the modification example described above, the aspect in which the support material S formed by the cushioning material KE is accommodated in the packaging box 2 has been described as an example, but the present disclosure is not limited to such an aspect. The packaging box 2 may be configured using the cushioning material KE.

For example, it may be characterized in that the packaged product according to the present modification example includes the packaging box 2 formed by folding the cushioning sheet QET and the electronic device 100 packed in the packaging box 2, the cushioning sheet QET includes the cushioning sheet QE and the cushioning sheet QT having a strength stronger than that of the cushioning sheet QE, and the packaging box 2 is formed by folding the cushioning sheet QET at the portion formed by the cushioning sheet QT.

C. Third Embodiment

A cushioning material according to a third embodiment will be described below with reference to FIGS. 17 to 22. In each embodiment illustrated below, elements whose actions and functions are similar to those of the first embodiment or the second embodiment will be denoted by the same reference numerals used in the description of the first embodiment or the second embodiment and detailed description thereof will be omitted as appropriate.

C. 1. Overview of Cushioning Material According to Third Embodiment

Figure 17:
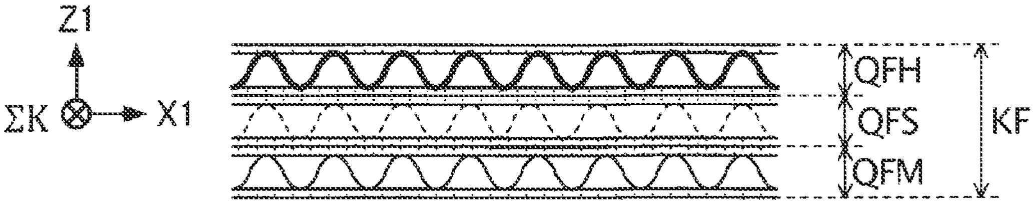
FIG. 17 is an exploded perspective view showing an example of a configuration of a cushioning material according to a third embodiment of the present disclosure.

FIG. 17 is a cross-sectional view of a cushioning material KF according to the third embodiment when the cushioning material KF is cut along a plane having a normal direction in the Y1 direction. The cushioning material KF is used to form the support material S instead of the cushioning material K in FIG. 1.

As shown in FIG. 17, the cushioning material KF has a configuration in which a cushioning sheet QFS, a cushioning sheet QFM having a strength stronger than that of the cushioning sheet QFS, and a cushioning sheet QFH having a strength stronger than that of the cushioning sheet QFM are stacked. Specifically, in the present embodiment, in the cushioning material KF, the cushioning sheet QFS is stacked between the cushioning sheet QFM and the cushioning sheet QFH.

Figure 18:
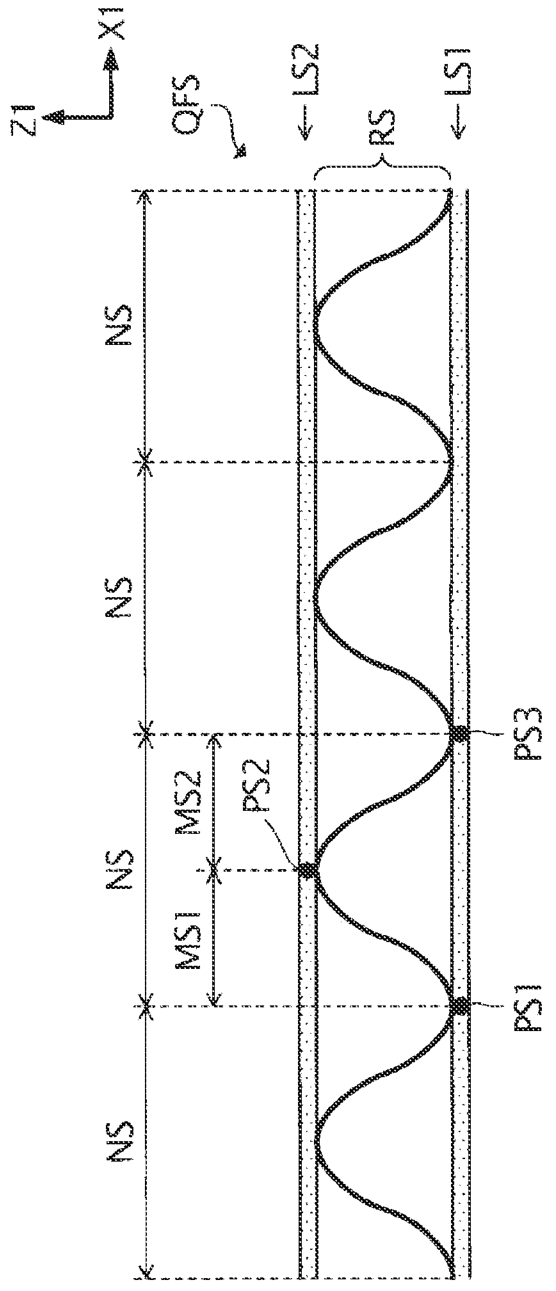
FIG. 18 is a cross-sectional view showing an example of a structure of a cushioning sheet.

FIG. 18 is a cross-sectional view of the cushioning sheet QFS when the cushioning sheet QFS is cut along a plane having the Y1 direction as a normal direction.

As shown in FIG. 18, the cushioning sheet QFS includes a liner LS1, a liner LS2, and a core RS.

The liner LS1 is a flat plate-shaped member formed of paper. The liner LS2 is a flat plate-shaped member formed of paper and is arranged in the Z1 direction of the liner LS1.

The core RS is a corrugated member formed of paper and supports the liner LS1 and the liner LS2 between the liner LS1 and the liner LS2. Specifically, the core RS has a plurality of corrugated portions NS that are periodically arranged.

The corrugated portion NS includes a support body MS1 and a support body MS2. The support body MS1 is fixed to the liner LS1 at a coupling point PS1 and is fixed to the liner LS2 at a coupling point PS2 located in the X1 direction from the coupling point PS1, thereby supporting the liner LS1 and the liner LS2. The support body MS2 is fixed to the liner LS2 at the coupling point PS2 and is fixed to the liner LS1 at a coupling point PS3 located in the X1 direction from the coupling point PS2, thereby supporting the liner LS1 and the liner LS2.

Figure 19:
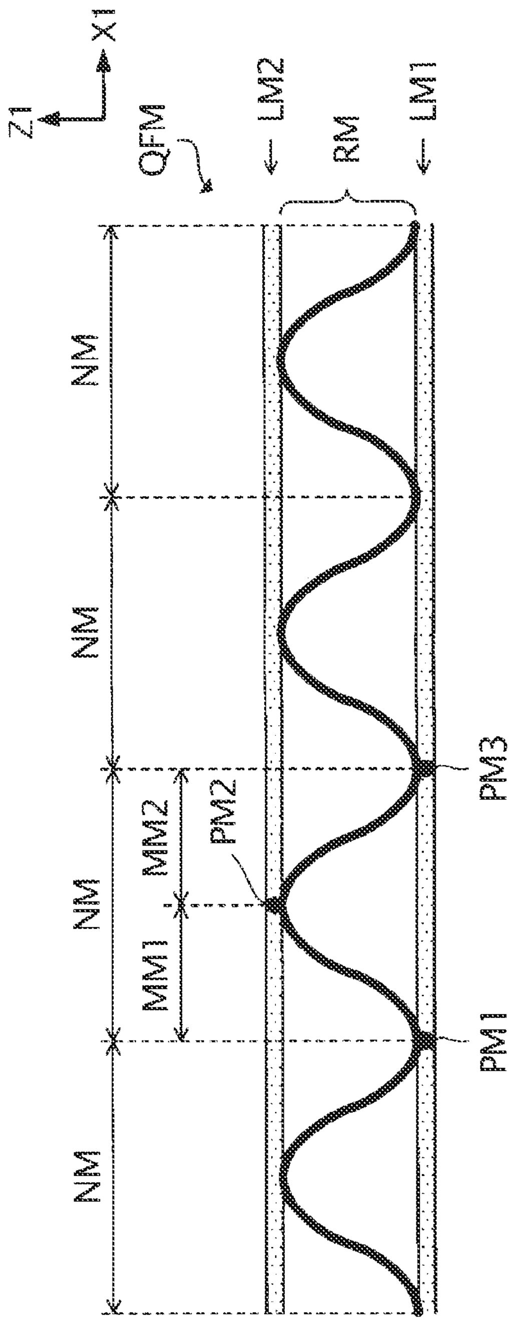
FIG. 19 is a cross-sectional view showing an example of a structure of a cushioning sheet.

FIG. 19 is a cross-sectional view of the cushioning sheet QFM when the cushioning sheet QFM is cut along a plane having the Y1 direction as a normal direction.

As shown in FIG. 19, the cushioning sheet QFM includes a liner LM1, a liner LM2, and a core RM.

The liner LM1 is a flat plate-shaped member formed of paper. The liner LM2 is a flat plate-shaped member formed of paper and is arranged in the Z1 direction of the liner LM1.

The core RM is a corrugated member formed of paper and supports the liner LM1 and the liner LM2 between the liner LM1 and the liner LM2. Specifically, the core RM has a plurality of corrugated portions NM that are periodically arranged.

The corrugated portion NM includes a support body MM1 and a support body MM2. The support body MM1 is fixed to the liner LM1 at a coupling point PM1 and is fixed to the liner LM2 at a coupling point PM2 located in the X1 direction from the coupling point PM1, thereby supporting the liner LM1 and the liner LM2. The support body MM2 is fixed to the liner LM2 at the coupling point PM2 and is fixed to the liner LM1 at a coupling point PM3 located in the X1 direction from the coupling point PM2, thereby supporting the liner LM1 and the liner LM2.

Figure 20:
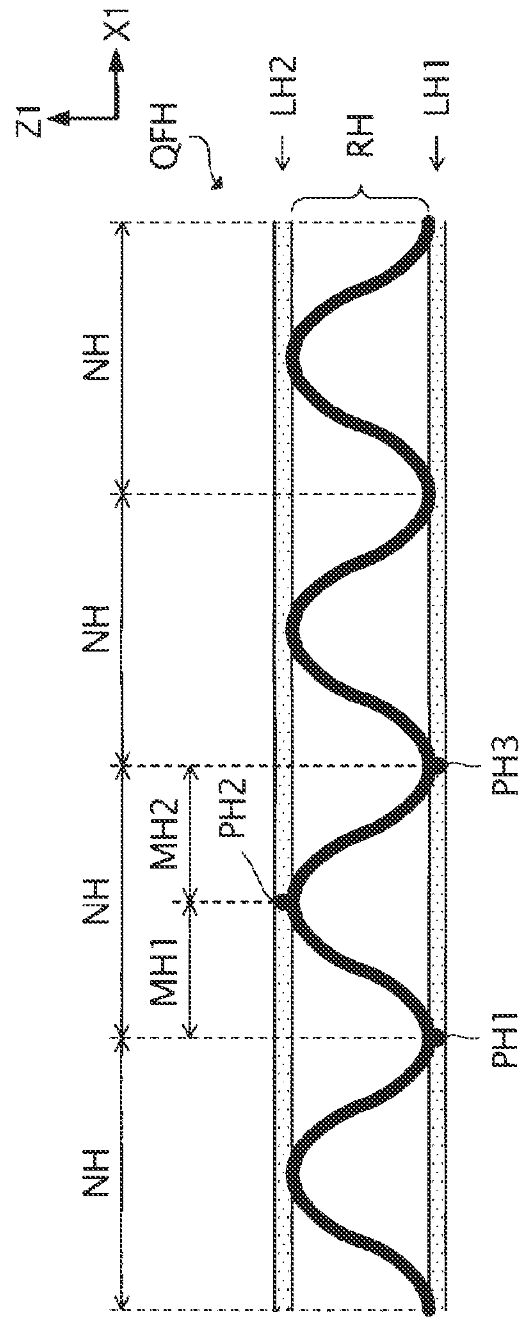
FIG. 20 is a cross-sectional view showing an example of a structure of a cushioning sheet.

FIG. 20 is a cross-sectional view of the cushioning sheet QFH when the cushioning sheet QFH is cut along a plane having the Y1 direction as a normal direction.

As shown in FIG. 20, the cushioning sheet QFH includes a liner LH1, a liner LH2, and a core RH.

The liner LH1 is a flat plate-shaped member formed of paper. The liner LH2 is a flat plate-shaped member formed of paper and is arranged in the Z1 direction of the liner LH1.

The core RH is a corrugated member formed of paper and supports the liner LH1 and the liner LH2 between the liner LH1 and the liner LH2. Specifically, the core RH has a plurality of corrugated portions NH that are periodically arranged.

The corrugated portion NH includes a support body MH1 and a support body MH2. The support body MH1 is fixed to the liner LH1 at a coupling point PH1 and is fixed to the liner LH2 at a coupling point PH2 located in the X1 direction from the coupling point PH1, thereby supporting the liner LH1 and the liner LH2. The support body MH2 is fixed to the liner LH2 at the coupling point PH2 and is fixed to the liner LH1 at a coupling point PH3 located in the X1 direction from the coupling point PH2, thereby supporting the liner LH1 and the liner LH2.

In the present embodiment, the thickness of the core RM of the cushioning sheet QFM is made thicker than the thickness of the core RS of the cushioning sheet QFS, such that the strength of the cushioning sheet QFM is made stronger than the strength of the cushioning sheet QFS. However, the present disclosure is not limited to such an aspect. By making the density of the corrugated portion NM of the core RM of the cushioning sheet QFM higher than the density of the corrugated portion NS of the core RS of the cushioning sheet QFS, the strength of the cushioning sheet QFM may be made stronger than the strength of the cushioning sheet QFS.

In addition, in the present embodiment, the thickness of the core RH of the cushioning sheet QFH is made thicker than the thickness of the core RM of the cushioning sheet QFM, such that the strength of the cushioning sheet QFH is made stronger than the strength of the cushioning sheet QFM. However, the present disclosure is not limited to such an aspect. By making the density of the corrugated portion NH of the core RH of the cushioning sheet QFH higher than the density of the corrugated portion NM of the core RM of the cushioning sheet QFM, the strength of the cushioning sheet QFH may be made stronger than the strength of the cushioning sheet QFM.

Further, in the present embodiment, it is assumed that the cushioning material KF has a configuration in which three cushioning sheets Q, namely, the cushioning sheet QFM, the cushioning sheet QFH stacked at a position in the Z1 direction when viewed from the cushioning sheet QFM, and the cushioning sheet QFS stacked between the cushioning sheet QFM and the cushioning sheet QFH, are continuously stacked. However, the present disclosure is not limited to such an aspect. The cushioning material KF may include another cushioning sheet Q, for example, a cushioning sheet QT, in addition to the cushioning sheet QFM, the cushioning sheet QFH, and the cushioning sheet QFS. In this case, the other cushioning sheet Q may be stacked at a position in the Z1 direction when viewed from the cushioning sheet QFH, may be stacked at a position in the Z2 direction when viewed from the cushioning sheet QFM, may be stacked between the cushioning sheet QFS and the cushioning sheets QFH, or may be stacked between the cushioning sheet QFS and the cushioning sheet QFM.

According to the present embodiment, when an external force is applied to the cushioning material KF, among the cushioning sheet QFS, the cushioning sheet QFM, and the cushioning sheet QFH, the cushioning sheet QFS having the weakest strength is deformed in order. Therefore, after unpacking the packaging material 1, by visually checking whether or not the cushioning sheet QFS is deformed, for example, it is possible to check after the fact whether or not an impact has been applied to the electronic device 100 packed in the packaging material 1 including the cushioning material KF. In addition, by visually recognizing which cushioning sheet is deformed, the magnitude of the impact applied to the electronic device 100 packed in the packaging material 1 including the cushioning material KF can be checked after the fact.

Further, according to the present embodiment, a cushioning sheet QFH having a strength stronger than that of the cushioning sheet QFS is provided between the cushioning sheet QFS and the electronic device 100. Therefore, according to the present embodiment, it is possible to prevent the cushioning sheet QFS from being crushed or deformed by a weak force as compared with the aspect in which the cushioning sheet QFH is not provided between the cushioning sheet QFS and the electronic device 100, and it is possible to reduce the risk of making an erroneous determination that an impact has been applied when the electronic device 100 is not subjected to the impact.

C. 2. Conclusion of Third Embodiment

As described above, it is characterized in that the cushioning material KF according to the present embodiment is a cushioning material KF having a multilayer structure, and includes the cushioning sheet QFS, the cushioning sheet QFM having a strength stronger than that of the cushioning sheet QFS, and the cushioning sheet QFH having a strength stronger than that of the cushioning sheet QFM.

In the present embodiment, the cushioning sheet QFS is an example of a "first layer", the cushioning sheet QFM is an example of a "second layer", and the cushioning sheet QFH is an example of a "third layer".

In this way, in the present embodiment, the cushioning material KF includes the cushioning sheet QFH, the cushioning sheet QFM, and the cushioning sheet QFS having a strength weaker than those of the cushioning sheet QFH and the cushioning sheet QFM. Therefore, according to the present embodiment, by visually checking the deformation or the like generated in the cushioning sheet QFS, for example, it is possible to ascertain the presence or absence of the impact applied to the electronic device 100 packed by the packaging material 1 including the cushioning material KF.

Further, it may be characterized in that, in the cushioning material KF according to the present embodiment, the plurality of cushioning sheets Q forming the cushioning material KF are composed of the cushioning sheet QFS, the cushioning sheet QFM, and the cushioning sheet QFH, and include three cushioning sheets Q which are continuously stacked.

Further, it may be characterized in that, in the cushioning material KF according to the present embodiment, the cushioning sheet QFS are stacked between the cushioning sheet QFM and the cushioning sheet QFH.

Therefore, according to the present embodiment, when an impact is not applied to the electronic device 100 packed by the packaging material 1 including the cushioning material KF, it is possible to reduce the risk of making an erroneous determination that the impact is applied.

Further, it may be characterized in that, in the cushioning material KF according to the present embodiment, the cushioning sheet QFS includes the flat plate-shaped liner LS1 and the core RS attached to the liner LS1 and having the corrugated portion NS, the cushioning sheet QFM includes the flat plate-shaped liner LM1 and the core RM attached to the liner LM1 and having the corrugated portion NM arranged at a higher density than the corrugated portion NS, and the cushioning sheet QFH includes the flat plate-shaped liner LH1 and the core RH attached to the liner LH1 and having the corrugated portion NH arranged at a higher density than the corrugated portion NM.

In the present embodiment, the liner LS1 is an example of a "first flat plate portion", the liner LM1 is an example of a "second flat plate portion", the liner LH1 is an example of a "third flat plate portion", the core RS is an example of a "first support portion", the core RM is an example of a "second support portion", and the core RH is an example of a "third support portion".

In this way, in the present embodiment, the core RM has the corrugated portion NM arranged at a higher density than the corrugated portion NS of the core RS, and the core RH has the corrugated portion NM arranged at a higher density than the corrugated portion NS of the core RM. Therefore, according to the present embodiment, the strength of the cushioning sheet QFM can be made stronger than that of the cushioning sheet QFS, and the strength of the cushioning sheet QFH can be made stronger than that of the cushioning sheet QFM.

Further, it may be characterized in that, in the cushioning material KF according to the present embodiment, the cushioning sheet QFS includes the flat plate-shaped liner LS1 and the core RS attached to the liner LS1 and having the corrugated portion NS, the cushioning sheet QFM includes the flat plate-shaped liner LM1 and the core RM attached to the liner LM1, thicker than the core RS, and having the corrugated portion NM, and the cushioning sheet QFH includes the flat plate-shaped liner LH1 and the core RH attached to the liner LH1, thicker than the core RM, and having the corrugated portion NH.

Therefore, according to the present embodiment, the strength of the cushioning sheet QFM can be made stronger than that of the cushioning sheet QFS, and the strength of the cushioning sheet QFH can be made stronger than that of the cushioning sheet QFM.

C. 3. Modification Example of Third Embodiment

Each of the aspects illustrated in the third embodiment can be variously modified. A specific aspect of modification is illustrated below. Any two or more aspects selected from the above-described embodiment and the following examples can be combined as appropriate as long as there is no contradiction.

Modification Example C1

In the third embodiment described above, a case where the cushioning material KF has a configuration in which the cushioning sheet QFS is stacked between the cushioning sheet QFM and the cushioning sheet QFH has been described as an example, but the present disclosure is not limited to such an aspect. For example, the cushioning material KF is only required to have the cushioning sheet QFS, the cushioning sheet QFM, and the cushioning sheet QFH among the plurality of cushioning sheets Q included in the cushioning material KF.

Figure 21:
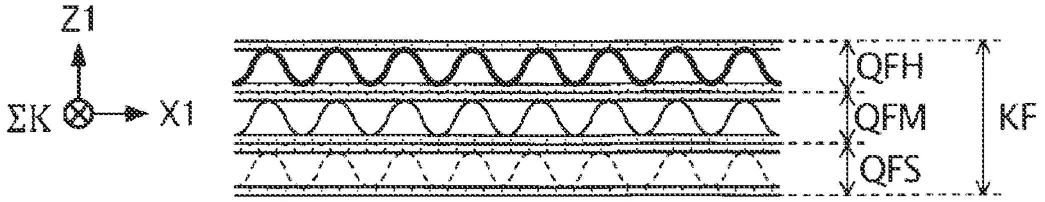
FIG. 21 is a cross-sectional view showing an example of a structure of the cushioning material shown in FIG. 17.

FIG. 21 is a cross-sectional view of a cushioning material KF according to the present modification example when the cushioning material KF is cut along a plane having the Y1 direction as a normal direction. The cushioning material KF according to the present modification example is used to form the support material S instead of the cushioning material K in FIG. 1.

As shown in FIG. 21, the cushioning material KF according to the present modification example has a configuration in which three cushioning sheets Q, namely, the cushioning sheet QFS, the cushioning sheet QFH stacked at a position in the Z1 direction when viewed from the cushioning sheet QFS, and the cushioning sheet QFM stacked between the cushioning sheet QFS and the cushioning sheet QFH, are continuously stacked.

Also in the present modification example, when an external force is applied to the cushioning material KF, among the cushioning sheet QFS, the cushioning sheet QFM, and the cushioning sheet QFH, the cushioning sheet QFS having the weakest strength is deformed first. Therefore, by visually checking whether or not the cushioning sheet QFS is deformed, for example, it is possible to check after the fact whether or not an impact has been applied to the electronic device 100 packed in the packaging material 1 including the cushioning material KF.

Modification Example C2

In the third embodiment and the modification example described above, a case where the cushioning material KF is used to form the support material S included in the packaging material 1 shown in FIG. 1 has been described as an example, but the present disclosure is not limited to such an aspect. The cushioning material KF may be used to form a packaging material other than the packaging material 1.

Figure 22:
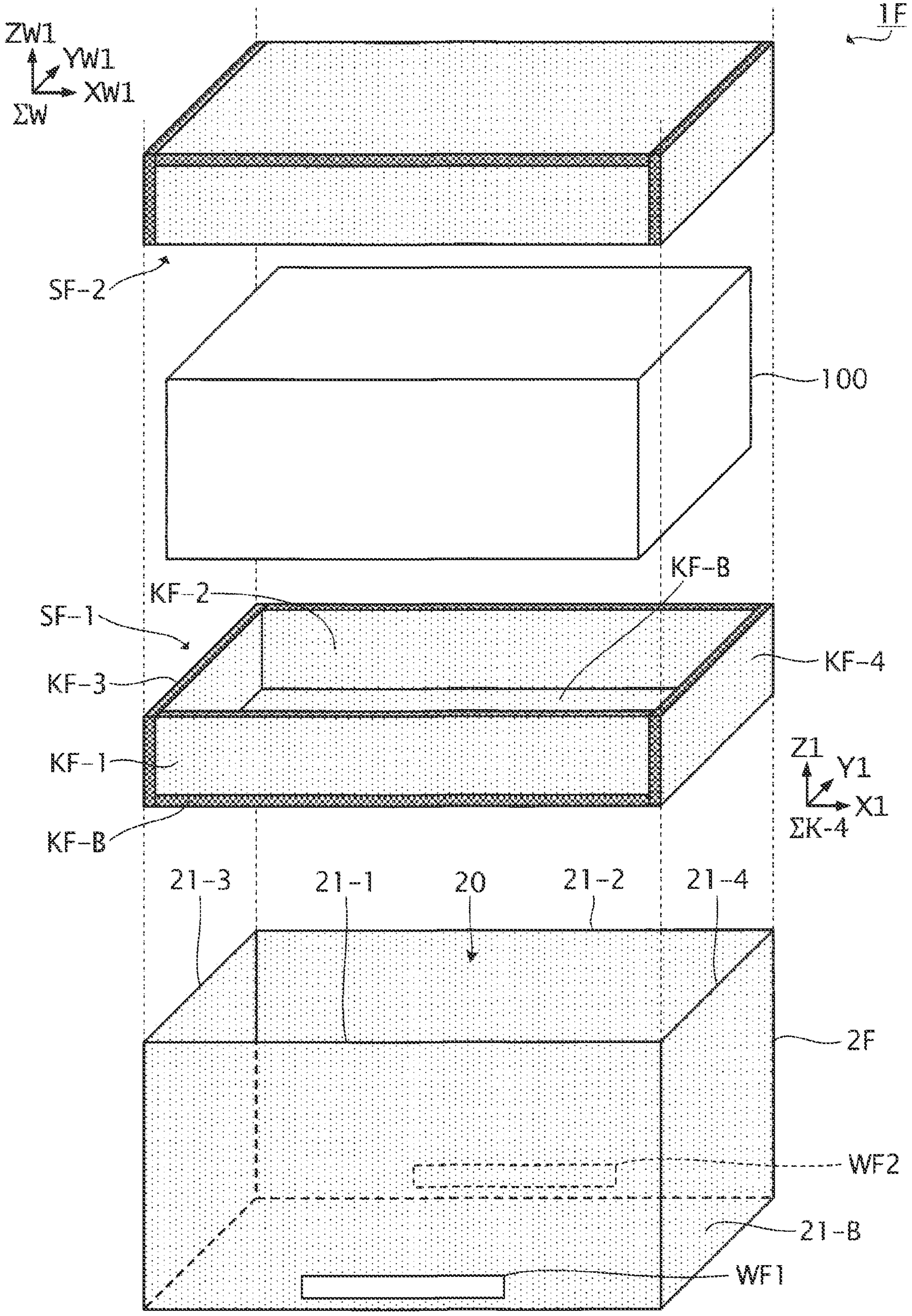
FIG. 22 is an exploded perspective view showing an example of a configuration of a packaging material.

FIG. 22 is an exploded perspective view showing a configuration of a packaging material 1F according to the present modification example.

As shown in FIG. 22, the packaging material 1F is different from the packaging material 1 shown in FIG. 1 in that a packaging box 2F is provided instead of the packaging box 2 and a support material SF is provided instead of the support material S.

In the present modification example, as an example, it is assumed that the packaging material 1F includes two support materials SF, that is, a support material SF-1 and a support material SF-2. Here, the support material SF-1 is a support material SF that holds the lower end portion of the electronic device 100 in the ZW2 direction of the electronic device 100 when the electronic device 100 is accommodated in the packaging box 2F. The support material SF-2 is a support material SF that holds the upper end portion of the electronic device 100 in the ZW1 direction of the electronic device 100 when the electronic device 100 is accommodated in the packaging box 2F.

The support material SF is formed by a plurality of cushioning materials KF. In the present modification example, as an example, it is assumed that the support material SF includes four cushioning materials KF-1 to KF-4 constituting the side surface of the support material SF and one cushioning material KF-B constituting the bottom surface of the support material SF.

In the present modification example, it is assumed that the support material SF-1 including the cushioning material KF-B is accommodated in the packaging box 2F such that the Y-axis of the cushioning material coordinate system ΣK fixed to the cushioning material KF-B and the YW axis of the packaging box coordinate system ZW fixed to the packaging material 1F are parallel to each other.

The packaging box 2F includes four side surfaces 21-1 to 21-4, a bottom surface 21-B, and four upper lids 200 corresponding to the four side surfaces 21-1 to 21-4 one-to-one. In FIG. 22, the upper lid 200 is not illustrated.

As shown in FIG. 22, among the four side surfaces 21-1 to 21-4 of the packaging box 2F, the side surface 21-1 and the side surface 21-2 are side surfaces having the YW1 direction as the normal direction. An opening WF1 is provided on the side surface 21-1. An opening WF2 is provided on the side surface 21-2.

Specifically, the opening WF1 is provided at a position where the cushioning sheet QFS included in the cushioning material KF-B can be visually recognized when the support material SF-1 including the cushioning material KF-B is accommodated in the packaging box 2F. Further, the opening WF2 is provided at a position where the cushioning sheet QFS included in the cushioning material KF-B can be visually recognized when the support material SF-1 including the cushioning material KF-B is accommodated in the packaging box 2F. The opening WF1 and the opening WF2 are provided at substantially the same positions in the YW1 direction and the ZW1 direction.

As described above, the Y-axis of the cushioning material coordinate system ΣK fixed to the cushioning material KF-B and the YW axis of the packaging box coordinate system ZW fixed to the packaging material 1F are assembled so as to be parallel to each other. Thus, for example, when the packaging material 1F is viewed in the YW1 direction from the opening WF1 toward the opening WF2 and the cushioning sheet QFS is not crushed, the external light incident from the opening WF2 passes through the gaps between the corrugated portions NS of the cushioning sheet QFS and exits through the opening WF1 without being blocked by the core RS of the cushioning sheet QFS provided in the cushioning material KF-B. Therefore, when the packaging material 1F is viewed in the YW1 direction from the opening WF1 toward the opening WF2, it is possible to visually recognize the corrugated shape of the corrugated portion NS of the cushioning sheet QFS provided in the cushioning material KF-B due to the external light incident from the opening WF2.

In this way, it is characterized in that the packaged product according to the present modification example includes the packaging box 2F, the electronic device 100 packed in the packaging box 2F, and the cushioning material KF having a multilayer structure that is accommodated in the packaging box 2F and supports the electronic device 100 inside the packaging box 2F, the cushioning material KF includes the cushioning sheet QFS, the cushioning sheet QFM having a strength stronger than that of the cushioning sheet QFS, and the cushioning sheet QFH having a strength stronger than that of the cushioning sheet QFM, and the packaging box 2F is provided with the opening WF1 and the opening WF2 for making the cross section of the cushioning material KF visible in the cushioning material KF.

Therefore, according to the present modification example, the presence or absence of an impact applied to the electronic device 100 packed in the packaging material 1F including the cushioning material KF and the magnitude of the impact applied to the electronic device 100 can be grasped at any time without unpacking the packaging material 1F.

Modification Example C3

In the third embodiment and the modification example described above, the aspect in which the support material SF or the support material S formed by the cushioning material KF is accommodated in the packaging box 2 or the packaging box 2F has been described as an example, but the present disclosure is not limited to such an aspect. The packaging box 2 or the packaging box 2F may be configured using the cushioning material KF.

For example, it may be characterized in that the packaged product according to the present modification example includes the packaging box 2F configured by the cushioning material KF having a multilayer structure and the electronic device 100 packed in the packaging box 2F, the cushioning material KF includes the cushioning sheet QFS, the cushioning sheet QFM having a strength stronger than that of the cushioning sheet QFS, and the cushioning sheet QFH having a strength stronger than that of the cushioning sheet QFM, and the packaging box 2F is provided such that the cross section of the cushioning sheet QFS in the cushioning material KF constituting the packaging box 2F can be visually recognized.

Other Modification Examples

Each embodiment and each modification example described in the present application can be combined with each other. For example, the cushioning material of the second embodiment may be stacked on the cushioning material or the electronic device side of the packaging box of the first embodiment. Further, in the first embodiment and the second embodiment, the strength of each layer may be changed as in the third embodiment.

In addition, the number of layers included in the cushioning material and the packaging box can be increased or decreased as needed. Further, the manufacturing method is not limited, and for example, each layer may be manufactured separately and then stacked, or the liner and the support body may be alternately stacked. In the latter case, the portion where the cushioning material and the liner of the packaging box are doubled is made into a single layer and serves as both the lower liner of the upper layer and the upper liner of the lower layer.

Further, the cushioning material and the packaging box are not limited to paper made from trees, and may be made of various materials such as paper made of synthetic resin and cloth.

Only one of the cushioning material and the packaging box may be formed of the cushioning sheet of the present application, or both may be formed of the cushioning sheet of the present application.

What is claimed is:

1. A cushioning material having a multilayer structure, the cushioning material comprising:

a first layer;

a second layer having a strength stronger than that of the first layer, and a third layer having a strength stronger than that of the second layer, the first layer including a first flat plate portion having a flat plate shape, and a first support portion attached to the first flat plate portion and having a corrugated shape, the first support portion including a first surface and a second surface, the first surface facing the first flat plate portion, the first surface and the second surface oppositely facing along a first direction with a first thickness defined as a distance between the first surface and the second surface along the first direction, the second layer including a second flat plate portion having a flat plate shape, and a second support portion attached to the second flat plate portion and having a corrugated shape, the second support portion including a third surface and a fourth surface, the third surface facing the second flat plate portion, the third surface and the fourth surface oppositely facing along a second direction with a second thickness defined as a distance between the third surface and the fourth surface along the second direction, the second thickness being thicker than the first thickness, and the third layer including a third flat plate portion having a flat plate shape, and a third support portion attached to the third flat plate portion and having a corrugated shape, the third support portion including a fifth surface and a sixth surface, the fifth surface facing the third flat plate portion, the fifth surface and the sixth surface oppositely facing along a third direction with a third thickness defined as a distance between the fifth surface and the sixth surface along the third direction, the third thickness being thicker than the second thickness, each of the first layer, the second layer, and the third layer being a single layer, the multilayer structure being composed of the first layer, the second layer, and the third layer, which are continuously stacked, and in response to an external force being applied to the cushioning material, the first layer being configured to be deformed first among the first layer, the second layer, and the third layer, and the first layer, the second layer, and the third layer being deformable in an order of the first layer, the second layer, and the third layer.

2. The cushioning material according to claim 1, wherein the first layer is stacked between the second layer and the third layer.

3. The cushioning material according to claim 1, wherein the second support portion has a higher density than the first support portion, and the third support portion has a higher density than the second support portion.

4. A packaged product comprising:

a packaging box configured by a cushioning material having a multilayer structure; and contents packed in the packaging box, the cushioning material including a first layer, a second layer having a strength stronger than that of the first layer, and a third layer having a strength stronger than that of the second layer, the first layer including a first flat plate portion having a flat plate shape, and a first support portion attached to the first flat plate portion and having a corrugated shape, the first support portion including a first surface and a second surface, the first surface facing the first flat plate portion, the first surface and the second surface oppositely facing along a first direction with a first thickness defined as a distance between the first surface and the second surface along the first direction, the second layer including a second flat plate portion having a flat plate shape, and a second support portion attached to the second flat plate portion and having a corrugated shape, the second support portion including a third surface and a fourth surface, the third surface facing the second flat plate portion, the third surface and the fourth surface oppositely facing along a second direction with a second thickness defined as a distance between the third surface and the fourth surface along the second direction, the second thickness being thicker than the first thickness, and the third layer including a third flat plate portion having a flat plate shape, and a third support portion attached to the third flat plate portion and having a corrugated shape, the third support portion including a fifth surface and a sixth surface, the fifth surface facing the third flat plate portion, the fifth surface and the sixth surface oppositely facing along a third direction with a third thickness defined as a distance between the fifth surface and the sixth surface along the third direction, the third thickness being thicker than the second thickness, and the packaging box being provided such that a cross section of the first layer in the cushioning material is visually recognizable, each of the first layer, the second layer, and the third layer being a single layer, the multilayer structure being composed of the first layer, the second layer, and the third layer, which are continuously stacked, and in response to an external force being applied to the cushioning material, the first layer being configured to be deformed first among the first layer, the second layer, and the third layer, and the first layer, the second layer, and the third layer being deformable in an order of the first layer, the second layer, and the third layer.

5. A packaged product comprising:

a packaging box;

contents packed in the packaging box; and a cushioning material having a multilayer structure that is accommodated in the packaging box and supports the contents inside the packaging box, the cushioning material including a first layer, a second layer having a strength stronger than that of the first layer, and a third layer having a strength stronger than that of the second layer, the first layer including a first flat plate portion having a flat plate shape, and a first support portion attached to the first flat plate portion and having a corrugated shape, the first support portion including a first surface and a second surface, the first surface facing the first flat plate portion, the first surface and the second surface oppositely facing along a first direction with a first thickness defined as a distance between the first surface and the second surface along the first direction, the second layer including a second flat plate portion having a flat plate shape, and a second support portion attached to the second flat plate portion and having a corrugated shape, the second support portion including a third surface and a fourth surface, the third surface facing the second flat plate portion, the third surface and the fourth surface oppositely facing along a second direction with a second thickness defined as a distance between the third surface and the fourth surface along the second direction, the second thickness being thicker than the first thickness, and the third layer including a third flat plate portion having a flat plate shape, and a third support portion attached to the third flat plate portion and having a corrugated shape, the third support portion including a fifth surface and a sixth surface, the fifth surface facing the third flat plate portion, the fifth surface and the sixth surface oppositely facing along a third direction with a third thickness defined as a distance between the fifth surface and the sixth surface along the third direction, the third thickness being thicker than the second thickness, and the packaging box being provided with an opening such that a cross section of the cushioning material is visually recognizable, each of the first layer, the second layer, and the third layer being a single layer, the multilayer structure being composed of the first layer, the second layer, and the third layer, which are continuously stacked, and in response to an external force being applied to the cushioning material, the first layer being configured to be deformed first among the first layer, the second layer, and the third layer, and the first layer, the second layer, and the third layer being deformable in an order of the first layer, the second layer, and the third layer.

* * * * *